(12) United States Patent
Aisu et al.

(10) Patent No.: US 11,954,728 B2
(45) Date of Patent: Apr. 9, 2024

(54) INFORMATION PROCESSING DEVICE, INFORMATION PROCESSING METHOD, AND NON-TRANSITORY COMPUTER READABLE MEDIUM

(71) Applicants: KABUSHIKI KAISHA TOSHIBA, Tokyo (JP); TOSHIBA ENERGY SYSTEMS & SOLUTIONS CORPORATION, Kawasaki Kanagawa (JP)

(72) Inventors: Hideyuki Aisu, Kawasaki Kanagawa (JP); Takufumi Yoshida, Funabashi Chiba (JP); Shigeta Kuninobu, Yokohama Kanagawa (JP); Hiromasa Shin, Yokohama Kanagawa (JP); Yoshiaki Shiga, Kawasaki Kanagawa (JP); Kotaro Kimura, Yokohama Kanagawa (JP); Yuki Hayashi, Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 110 days.

(21) Appl. No.: 17/470,966

(22) Filed: Sep. 9, 2021

(65) Prior Publication Data

US 2022/0156828 A1 May 19, 2022

(30) Foreign Application Priority Data

Nov. 16, 2020 (JP) .................................. 2020-190538

(51) Int. Cl.
- *G06Q 40/04* (2012.01)
- *G06Q 30/08* (2012.01)
- *G06Q 50/06* (2012.01)

(52) U.S. Cl.
CPC ............. *G06Q 30/08* (2013.01); *G06Q 40/04* (2013.01); *G06Q 50/06* (2013.01)

(58) Field of Classification Search
CPC ......... G06Q 30/08; G06Q 40/04; G06Q 50/06
(Continued)

(56) References Cited

U.S. PATENT DOCUMENTS 9,310,785 B2  4/2016 Otsuki et al.
10,110,153 B2 10/2018 Deguchi et al.
(Continued)

FOREIGN PATENT DOCUMENTS

EP   3 709 250 A1   9/2020
EP   3 876 180 A1   9/2021
(Continued)

OTHER PUBLICATIONS

H. Hiromoto, et al., "Power Trade™ Energy Trading and Risk Management System," Toshiba Rev., vol. 59, No. 4, pp. 48-51 (2004).
(Continued)

*Primary Examiner* — Robert R Niquette
(74) *Attorney, Agent, or Firm* — Finnegan, Henderson, Farabow, Garrett & Dunner, LLP

(57) ABSTRACT

According to one embodiment, an information processing device includes processing circuitry configured to calculate a first index based on a plurality of pieces of first prediction data on an amount of electric power generated by a first electric power generation resource and a penalty imposed when an amount of electric power supplied to an electric power system is insufficient or excessive for a first amount of electric power which corresponds to a planned value of electric power generation amount, the first index being an index related to a yield obtained in a case that the first amount of electric power is tentatively bid in a first market;
(Continued)

and determine a second amount of electric power to be bid in the first market based on the first index.

15 Claims, 14 Drawing Sheets

(58) Field of Classification Search
USPC .................................................. 705/35–45
See application file for complete search history.

(56) References Cited

U.S. PATENT DOCUMENTS

| | | | | |
|---|---|---|---|---|
| 2003/0045969 | A1* | 3/2003 | Matsuo | G06Q 50/06 700/297 |
| 2004/0215545 | A1 | 10/2004 | Murakami et al. | |
| 2014/0330532 | A1* | 11/2014 | Simmons | G01R 21/00 702/60 |
| 2016/0061869 | A1* | 3/2016 | Dittmer | F27D 19/00 702/61 |
| 2019/0012687 | A1 | 1/2019 | Endoh et al. | |
| 2019/0279239 | A1* | 9/2019 | Ikemoto | G06Q 30/0206 |
| 2019/0362444 | A1* | 11/2019 | Terrell | G01F 15/063 |
| 2020/0074570 | A1* | 3/2020 | Yu | G06Q 10/04 |
| 2020/0327626 | A1* | 10/2020 | Leung | G06Q 50/06 |
| 2021/0019821 | A1* | 1/2021 | Achar | G06F 18/2178 |
| 2021/0151989 | A1* | 5/2021 | Tsujii | H02J 3/003 |
| 2021/0304300 | A1* | 9/2021 | Otogasako | H02J 3/004 |
| 2022/0122163 | A1* | 4/2022 | Obata | G06Q 30/08 |

FOREIGN PATENT DOCUMENTS

| | | |
|---|---|---|
| EP | 3 882 844 A1 | 9/2021 |
| JP | 2004-252967 A | 9/2004 |
| JP | 2007-4646 A | 1/2007 |
| JP | 4400324 B2 | 1/2010 |
| JP | 4660281 B2 | 3/2011 |
| JP | 2015-27257 A | 2/2015 |
| JP | 2016-62191 A | 4/2016 |
| JP | 2016-170468 A | 9/2016 |
| JP | 2018-33237 A | 3/2018 |
| JP | 2019-16110 A | 1/2019 |
| JP | 2020-149475 A | 9/2020 |
| JP | 2021-149651 A | 9/2021 |

OTHER PUBLICATIONS

Energy Information Center General Incorporated Association, New Electric Power Management Office, "The supply and demand adjustment market that general power transmission and distribution companies are developing, what responses are necessary on the business side?," https://pps-net.org/column/61837, 7 pages, and machine translation, 8 pages (2018).

* cited by examiner

SPOT MARKET PRICE RESULT DATA

| YEAR, MONTH, DAY | TIME SLOT | PRICE |
|---|---|---|
| 2019/4/1 | 1 | 6.66 |
| 2019/4/1 | 2 | 6.66 |
| 2019/4/1 | 3 | 6.59 |
| ... | ... | ... |

INTRADAY MARKET PRICE RESULT DATA

| YEAR, MONTH, DAY | TIME SLOT | OPENING VALUE | HIGH VALUE | LOW VALUE | CLOSING VALUE | AVERAGE |
|---|---|---|---|---|---|---|
| 2019/4/1 | 1 | 6.46 | 6.69 | 6.01 | 6.50 | 6.14 |
| 2019/4/1 | 2 | 6.16 | 6.21 | 5.00 | 5.55 | 6.01 |
| 2019/4/1 | 3 | 5.59 | 6.70 | 5.15 | 5.66 | 6.44 |
| ... | ... | ... | ... | ... | ... | ... |

BALANCING MARKET PRICE RESULT DATA

| YEAR, MONTH, DAY | TIME SLOT | OPERATION VOLUME (ENERGY SELLING VOLUME) | AVERAGE UNIT PRICE |
|---|---|---|---|
| 2019/4/1 | 1 | 196099 | 7.83 |
| 2019/4/1 | 2 | 300429 | 7.61 |
| 2019/4/1 | 3 | 166164 | 7.64 |
| ... | ... | ... | ... |

FIG. 5

| PLACE ID | DATE | TIME | TEMPERATURE [°C] | INSOLATION INTENSITY [MJ/m$^2$] | WIND SPEED [m/s] | PRECIPITATION [mm] |
|---|---|---|---|---|---|---|
| ... | ... | ... | ... | ... | ... | ... |
| 001 | 2019/04/01 | 0:00 | 11.2 | 0.0 | 3.4 | 0.0 |
| 001 | 2019/04/01 | 0:30 | 10.9 | 0.0 | 3.5 | 0.5 |
| 001 | 2019/04/01 | 1:00 | 10.3 | 0.0 | 2.9 | 1.5 |
| 001 | 2019/04/01 | 1:30 | 10.1 | 0.0 | 3.9 | 2.0 |
| 001 | 2019/04/01 | 2:00 | 10.0 | 0.0 | 3.9 | 1.2 |
| 001 | 2019/04/01 | 2:30 | 10.0 | 0.0 | 4.9 | 1.0 |
| 001 | 2019/04/01 | 3:00 | 9.9 | 0.0 | 4.1 | 2.5 |
| 001 | 2019/04/01 | 3:30 | 10.3 | 0.0 | 4.8 | 1.5 |
| 001 | 2019/04/01 | 4:00 | 10.5 | 0.0 | 5.4 | 3.5 |
| 001 | 2019/04/01 | 4:30 | 11.1 | 0.0 | 5.8 | 2.0 |
| 001 | 2019/04/01 | 5:00 | 11.5 | 0.0 | 4.6 | 2.0 |
| 001 | 2019/04/01 | 5:30 | 11.7 | 0.0 | 6.0 | 1.0 |
| ... | ... | ... | ... | ... | ... | ... |

FIG. 6

PREDICTION R

PREDICTION 2

PREDICTION 1

| TARGET DAY | TARGET TIME SLOT | SPOT MARKET PRICE PREDICTION VALUE | INTRADAY MARKET PRICE PREDICTION VALUE | PV-GENERATED ELECTRIC POWER AMOUNT PREDICTION VALUE | WIND-GENERATED ELECTRIC POWER AMOUNT PREDICTION VALUE |
|---|---|---|---|---|---|
| 2019/4/8 | 1 | 5 | 5 | 51 | 6 |
| 2019/4/8 | 2 | 8 | 9 | 93 | 9 |
| ... | ... | ... | ... | ... | ... |
| 2019/4/8 | 47 | 3 | 5 | 65 | 2 |
| 2019/4/8 | 48 | 8 | 5 | 68 | 7 |

FIG. 7

PREDICTION R

PREDICTION 2

| PREDICTION 1 | | | |
|---|---|---|---|
| YEAR, MONTH, DAY | TIME SLOT | OPERATION VOLUME (ENERGY SELLING VOLUME) | AVERAGE UNIT PRICE |
| 2019/4/1 | 1 | 196099 | 6.12 |
| 2019/4/1 | 2 | 300429 | 7.99 |
| ... | ... | ... | ... |
| 2019/4/1 | 48 | 96164 | 5.64 |

FIG. 8

INFORMATION PROCESSING DEVICE, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2020-190538, filed on Nov. 16, 2020, the entire contents of which are incorporated herein by reference.

FIELD

Embodiments described herein relates to an information processing device, an information processing method, and a non-transitory computer readable medium.

BACKGROUND

The present invention is targeted for what is called aggregation business that obtains a yield (or earnings) such as profit by buying electric power from a renewable energy business operator and selling the electric power in a plurality of markets. The generated energy volume of renewable energy power sources such as PV and wind power depend on weather and largely vary. In addition, electric power market prices irregularly vary in accordance with, for example, balance between supply and demand. Thus, conventionally, it has been typical to predict the generated amounts of renewable-energy electric power and the market prices and design a trade strategy with a highest yield based on prediction values. However, even prediction with high average accuracy temporarily leads to large error or upward and downward bias occurs in a particular time slot in some cases, and thus it is potentially difficult to stably acquire a trade yield by simply using prediction values.

An investment method of building a portfolio of a plurality of assets for risk reduction is available in the field of risk assets such as securities, and a similar method is available in the field of electric power trading. A trade plan is designed by narrowing down uncertainty factors and then calculating a risk-return index based on yield distribution through repetitive simulation based on a plurality of predictions. Different risk-return indexes are used depending on trader's trade strategies, and for example, when risk reduction is focused, an index such as Value at Risk (VaR), which is focused only on a poor part of yield distribution is calculated. However, an enormous number of combinations of predictions need to be assumed when a plurality of uncertainty factors such as generated energy volume and market prices are simultaneously taken into consideration, and thus conventionally, use of risk-return indexes has been limited to analysis of contents of medium-to-long term contracts.

Designing of a portfolio of bid amounts in electric power markets to optimize a return is difficult due to influence of uncertainties of both the generated amount of renewable-energy electric power and prices in the electric power markets.

BRIEF DESCRIPTION OF THE DRAWINGS

FIG. 5 is a diagram illustrating an example of samples of spot market price result data, intraday market price result data, and balancing market result data;

FIG. 6 is a diagram illustrating an example of weather prediction data stored in a data storage;

FIG. 7 is a diagram schematically illustrating an example of a plurality of predictions generated by a predictor;

FIG. 8 is a diagram illustrating an example in which a prediction value of an operation volume and a prediction value of an average price in each time slot are included in predictions 1 to R in FIG. 7;

DETAILED DESCRIPTION

According to one embodiment, an information processing device includes processing circuitry configured to calculate a first index based on a plurality of pieces of first prediction data on an amount of electric power generated by a first electric power generation resource and a penalty imposed when an amount of electric power supplied to an electric power system is insufficient or excessive for a first amount of electric power which corresponds to a planned value of electric power generation amount, the first index being an index related to a yield obtained in a case that the first amount of electric power is tentatively bid in a first market; and determine a second amount of electric power to be bid in the first market based on the first index.

A business model for an electric power aggregator will be described below as a technological background of the present embodiment.

Figure 1:
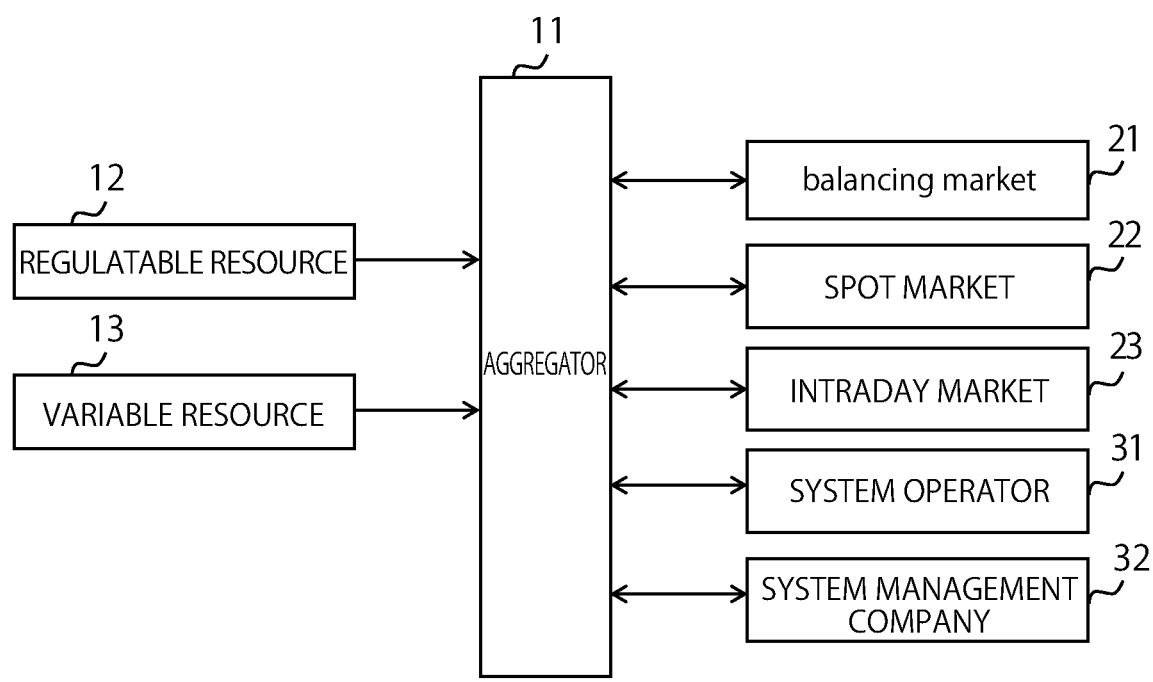
FIG. 1 is a diagram illustrating an entire overview of a business model for an electric power aggregator.

FIG. 1 illustrates an entire overview of a business model for an electric power aggregator. An electric power aggregator 11 (hereinafter referred to as an aggregator) can buy electric power from a business operator that generates electric power by using an regulatable resource (controllable resource) 12 and a business operator that generates electric power by using a variable resource 13, and can buy and sell electric power in an electric power market. A spot market 22 and an intraday (hour-ahead) market 23 are illustrated as exemplary electric power markets. The spot market 22 corresponds to, for example, a first market in which electric power is traded, and the intraday market 23 corresponds to, for example, a second market in which electric power is traded. In addition, a balancing market 21 (third market) different from an electric power market is illustrated. The aggregator 11 is connected with the management operator (system management operator) of an electric power system and a cost burden regulation agency.

Electric power of the regulatable resource 12 is an output-adjustable power source of, for example, biogas or biomass electric power generation and is, for example, a power source for which output adjustment control is promptly possible. The variable resource 13 is a power source, such as PV or wind power generation, the amount of generated electric power of which varies in accordance with an external condition such as weather.

The following describes an electric power market. In Japan, electric power is bought and sold through Japan Electric Power Exchange (JEPX). A plurality of kinds of markets are opened at JEPX, such as the spot market 22 (day-ahead market) in which electric power for next day is bought and sold, and the intraday market 23 (hour-ahead market) in which regulative trading is possible until one hour before actual supply and demand.

In the spot (day-ahead) market, a day is divided in the measurement units (30 minutes) of electric power into 48 time periods (product period), and electric power is traded for each time period. In the spot market, bidding for the time periods of the next day is closed daily in the morning. The time periods are independent from each other as products, and an agreed price (trade price) and an agreed amount are determined for each time period by a blind single-price auction scheme.

Figure 2:
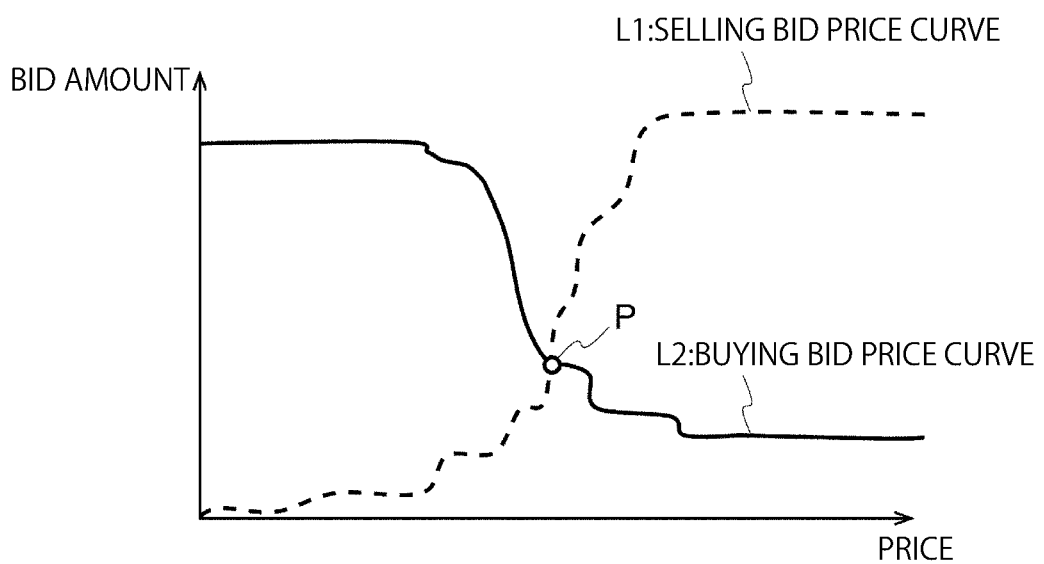
FIG. 2 is an explanatory diagram of a blind single-price auction scheme.

FIG. 2 is an explanatory diagram of the blind single-price auction scheme. Each participator who performs bidding in a bidding unit time frame (time slot) performs bidding in a state (blind) in which a bidding trend of other participators is not disclosed. After bidding is closed, a selling bid price curve L1 as accumulation of bid amounts in ascending order of the value of a sell bid and a buying bid price curve L2 as accumulation of bid amounts in descending order of the value of a buy bid are calculated, and an intersection point P of these curves is calculated. The intersection point P corresponds to an agreed price and an agreed amount in this bidding unit time frame (time slot). Only a seller having bid a price lower than the agreed price can sell a product (electric power) at the agreed price, and only a buyer having bid a price higher than the agreed price can buy a product (electric power) at the agreed price.

In the hour-ahead market, similarly to the spot market 22, 48 products obtained by dividing electric power for 24 hours in the units of 30 minutes are bought and sold. Each product is traded by what is called a continuous trading scheme in which trading (bidding and agreement) is repeated in real time until one hour before delivery.

Discussions have been made on various markets such as a capacity market and the balancing market 21 other than the spot (day-ahead) market and the intraday market (hour-ahead market) 23. The balancing market is a mechanism for a system operator 31 to procure a supply-demand regulation power source from the market and operate the power source. The method of managing the balancing market is largely different from that of electric power markets such as the spot market 22 and the intraday market.

In a case of Germany where the balancing market is already operated, the unit of bidding in the balancing market is a day, and whether operation (electric power generation) of succeeded (agreed) electric power is executed is not determined at a timing when a bid is succeeded (agreed). In other words, whether operation (electric power generation) is requested is not determined until right before actual supply and demand. A plurality of business operators (power source side business operators) of controllable resources each specify a bid capacity kW, a capacity unit price (yen/kW) corresponding to a fixed cost, and a unit supply price (yen/kWh) and perform bidding on the previous day. The system operator 31 agreed with the bids in ascending order of the capacity unit price up to a necessary capacity by using a capacity merit order list in which bids are arranged in order of capacity unit price. The capacity unit price (yen/kW) can be bid at a fixed price or can be bid at zero yen or the like for daily successful bidding, but determination of the capacity unit price is out of the scope of the present invention. The system operator 31 side instructs, by using a supply merit order list in which confirmed power sources (regulatable resources 12) are arranged in order of unit supply price (order of unit bid price), power source side business operators to perform supply up to a necessary amount of regulation at each time section. The power source business operator side generates electric power by using the controllable resources in accordance with the supply instruction. The sum of the amounts of generated electric power (operation volumes) of the power source side business operators is referred to as a total operation volume. Whether electric power supply is to be received (whether electric power is likely to be bought) is determined on the previous day, but an actual supply amount (energy volume in which electric power selling is actually executed) is not confirmed in advance. In this manner, in the balancing market, the unit supply price can be specified as a bid price at bidding, but the energy selling volume (operation volume) depends on the supply merit order list and thus cannot be controlled by the power source side business operator.

Figure 3A:
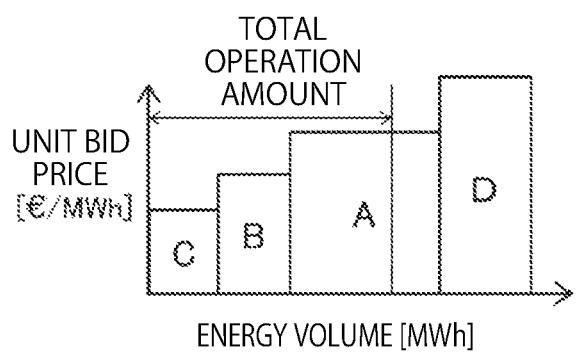
FIGS. 3A and 3B each is a diagram illustrating an example in which power source side business operators are caused to generate electric power in each time slot based on a supply merit order list.
Figure 3B:
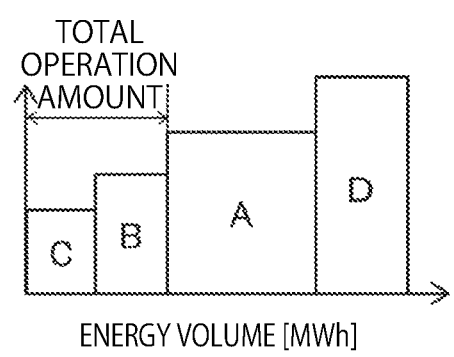

FIG. 3 illustrates an example in which power source side business operators are caused to generate electric power in each time slot based on the supply merit order list. The horizontal axis represents the amount of electric power (operation volume), and the vertical axis represents the unit bid price (unit supply price). In an example of (A) of FIG. 3, the entire amount of successful bid electric power is generated by business operator C and business operator B in accordance with the supply instruction from the system operator 31, but only part of the amount of successful bid electric power is actually generated by business operator A. None of the amount of successful bid electric power is generated by business operator D. In an example of (B) of FIG. 3, the entire amount of successful bid electric power is generated by business operator C and business operator B in accordance with the supply instruction from the system operator 31, but none of the amount of successful bid electric power is generated by business operator A and business operator D.

Subsequently, the aggregator 11 will be described below. The aggregator 11 makes a contract to buy electric power at a fixed price from a plurality of renewable-energy electric power generation business operators (business operators of the variable resources 13). The bought electric power is sold in two kinds of electric power markets, namely, the spot market 22 and the intraday market (hour-ahead market) 23. The aggregator 11 may bid part of electric power of the regulatable resource 12 in the balancing market 21.

The aggregator 11 assumes, for the variable resource 13, entire amount buying that an energy volume contracted in advance is bought unconditionally at a fixed price irrespective of the amount of generated electric power in each time slot. With the entire amount buying, each electric power generation business operator (power source side business operator) does not need to take risks in trading but has merits in participating in aggregation by paying a commission fee. However, the aggregator 11 side needs to control trading risks as a whole to generate profit.

In this example, what is called "margin" business that obtains profit by using price difference between markets is not business of the aggregator 11. However, for adjustment that prevents imbalance occurrence, electric power may be bought from the intraday market to meet an energy selling volume successfully bid in the spot market on the previous day.

Decision-making on the contents of bidding in each electric power market, which is of interest to the present embodiment is assumed to be decision-making at two stages, namely, previous day morning (right before gate close at the spot market and the balancing market 21) and T hours before gate close for a target product (electric power) of the intraday market. The decision-making at the second stage is made on a correction amount of bidding in the intraday market. In the decision-making at the first stage, for example, a bid amount of the target product of the intraday market is determined. Then, in the decision-making at the second stage, for example, the bid amount of the target product of the intraday market, which is determined at the first stage is corrected. Accordingly, it is possible to take into consideration, influence of actual weather, actual supply and demand, and the like in the duration between the first stage and the second stage and further optimize a return (such as a yield). It is assumed that a bought amount of electric power of the regulatable resource 12 is subordinately determined in a range except for a capacity successfully bid in the balancing market to prevent imbalance occurrence.

Subsequently, influence of various uncertainties in decision-making related to the contents of bidding in an electric power market will be described below.

First, the actual amount of generated electric power of the variable resource 13 potentially largely varies from an assumption at determination of the contents of bidding. Thus, with a business model on the premise of the entire amount buying, there are a risk that an imbalance penalty at imbalance occurrence is generated and a risk that electric power corresponding to a bid amount cannot be provided. When 30-minute simultaneous equal amount cannot be achieved for a planned value of electric power generation amount submitted in advance and overage or shortage in the energy volume occurs, a system management company 32 (cost burden regulation agency or management business operator) supplies insufficient electric power or buys surplus electric power at an imbalance price for regulation. The 30-minute simultaneous equal amount is a rule that the amount of electric power used in 30 minutes is equal to the amount of electric power generated in the same duration. When the amount of electric power exceeds the planned value of electric power generation amount, a surplus amount is bought by the system management company 32, and thus there is a loss when the imbalance price is lower than the market price, but no penalty charge needs to be paid. The imbalance price is not so largely different from the market price, and thus profit can be potentially improved by increasing the amount of electric power to be bid in an electric power market although accepting a risk of generation of some imbalance amount. It is important to consider risk-return balance.

As described above, there are a plurality of kinds of electric power markets in which buying and selling are possible for the same bidding unit time frame (time slot). Different agreement means and different bidding deadline times (gate close times) are set among the electric power markets. In such a case, the market price largely deviates among the electric power markets for the same bidding unit time frame in some cases. When variance of the market price is largely different among the electric power markets and an electric power selling ratio for a market such as the intraday market in which price variance is large is increased, a return is large in a successful case but a risk in a failure case is large as well. Thus, it is needed to appropriately design the ratio of distribution of an energy volume as a buying or selling target to be bid in the electric power markets for each bidding unit time frame, in other words, a market portfolio of electric power buying and selling.

In a case of the balancing market 21, the same handling is impossible since the balancing market 21 has properties different from those of the spot market 22 and the intraday market as described above. In the balancing market 21, there is a strong correlation between the actual energy selling volume (operation volume) and each of the capacity at bidding and the bid price (unit supply price or electric power selling price). The balancing market 21 has such a characteristic that the actual energy selling volume increases or decreases when the bid price is changed. The relation between the actual energy selling volume (operation volume) and each of the bid capacity and the bid price in the balancing market 21 is determined by a bidding distribution situation (operation pattern) on a target day. When a result of the operation volume and the average unit price of the bid price in each time slot is published, it is possible to presume the operation pattern on the day based on result data for one day. However, the operation pattern uncertainly varies for each unit of bidding duration (one day in a case of Germany), and thus the actual energy selling volume (operation volume) potentially largely varies with the same bid condition (the bid price and the bid capacity). This is a risk factor.

Figure 4:
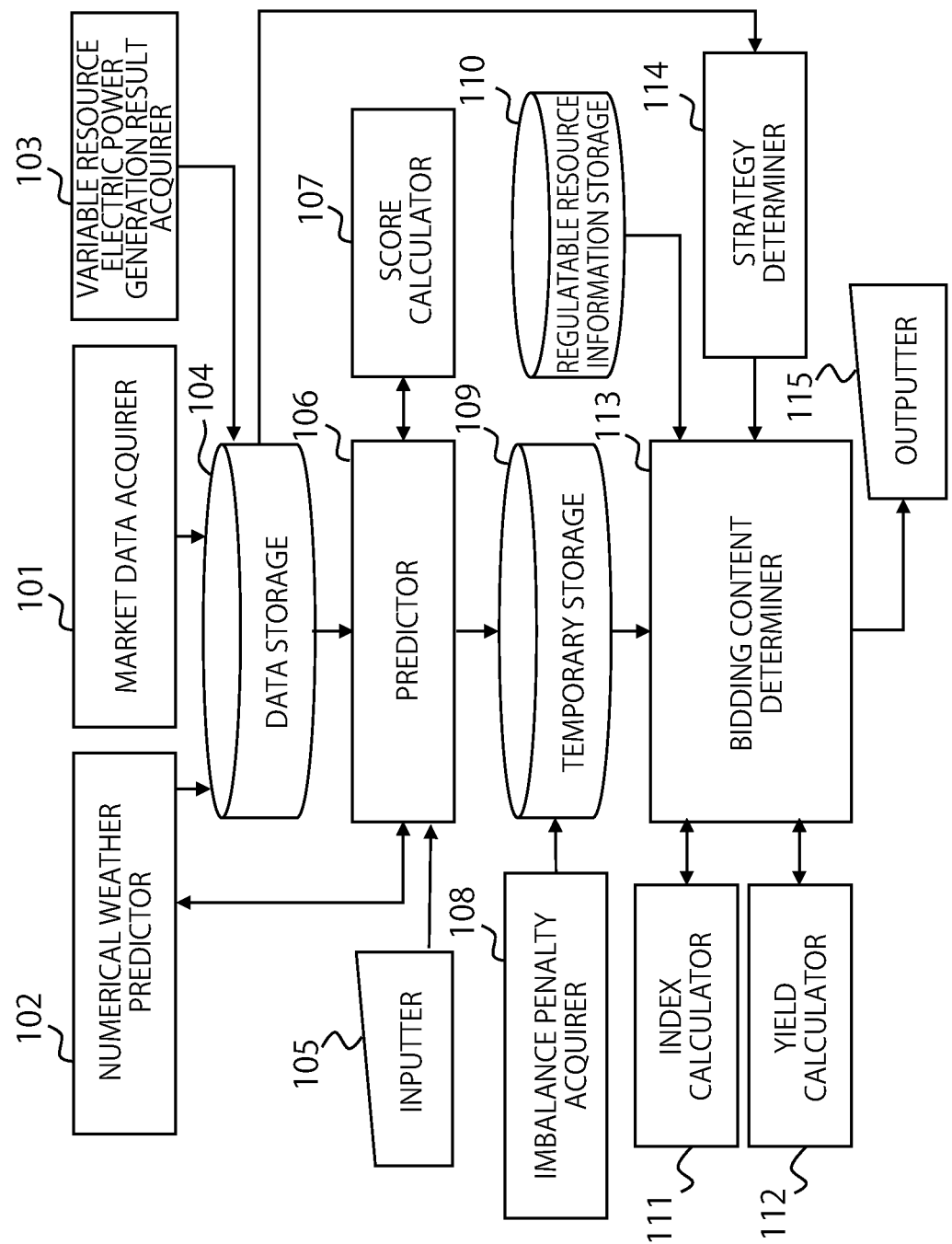
FIG. 4 is a block diagram illustrating an example of a trade support device as an information processing device according to the present embodiment.

FIG. 4 is a block diagram illustrating an example of a trade support device as an information processing device according to the present embodiment. The trade support device in FIG. 4 includes a market data acquirer 101, a numerical weather predictor 102, a variable resource electric power generation result acquirer 103, a data storage 104, an inputter 105, a predictor 106, a score calculator 107, an imbalance penalty acquirer 108, a temporary storage 109, a regulatable resource information storage 110, an index calculator 111, a yield calculator 112, a bidding content determiner 113 (first determiner), a strategy determiner 114 (second determiner), and an outputter 115. The inputter 105 and the outputter 115 correspond to interfaces through which information is input to and output from a user.

The market data acquirer 101 acquires, from an external electric power trade market system, trade result data of one or a plurality of electric power markets in which electric power is bought and sold. The trade result data includes the market price in each of a plurality of electric power trade markets as an actual value in the units of trade duration (for example, the units of 30-minute periods). The plurality of electric power markets include, for example, a spot market, an hour-ahead market, and a balancing market.

Examples of the actual value may include information on the bid amount of electric power as well as the market price. The market price in a market of the continuous trading scheme, such as an hour-ahead market, in which trading (bidding and agreement) is repeated in real time is a price such as the average price, the highest price, or the lowest price in a trade duration. The average price is assumed in this example.

The market data acquirer 101 stores the acquired trade result data in the data storage 104.

FIG. 5 illustrates exemplary samples of spot market price result data, intraday market price result data, and balancing market result data. The unit of the opening value, the high value, the low value, the closing value, and the average is, for example, yen/kWh. In the spot market price result data and the intraday market price result data, the ID number of each bidding unit time frame is set in the column of time slot. The time slot is set to be 30 minutes. The time slots of one day are 48 time slots identified by ID numbers 1 to 48. Hereinafter, the trade price in the spot market and the intraday market is assumed to be the average price but may be another price such as the opening value, the high value, the low value, or the closing value.

The balancing market result data includes the total operation volume (energy selling volume) of the spot market (or the intraday market) in each time slot, and the average price of the buying price of the system operator (the average price of the electric power selling price of a power source side business operator). As described above, the unit of bidding in the balancing market is not one time slot but one day. However, in the balancing market result data, a result of the total amount of operation performed in accordance with a request from the system operator is indicated for each time slot. The bid price (unit supply price) and the bid capacity of each power source business operator are individually published or actual values in some cases.

The variable resource electric power generation result acquirer 103 acquires, for each variable resource such as PV or wind power generation, generated energy volume result data of each past day and time (bidding unit time frame). The variable resource electric power generation result acquirer 103 stores the acquired generated energy volume result data in the data storage 104.

The numerical weather predictor 102 performs weather prediction and generates weather prediction data. The numerical weather predictor 102 stores the generated weather prediction data in the data storage 104.

The weather prediction data includes, for example, place IDs, time information (date and time), and weather prediction values of a plurality of places.

FIG. 6 illustrates an example of the weather prediction data stored in the data storage 104. Weather prediction values in the units of 30 minutes are indicated for a place of place ID of "001". Date and time are date and time of a prediction target. The time interval of the weather prediction values may be another interval such as 10 minutes or one day. Predicted weather amounts are temperature, insolation intensity, wind speed, and precipitation in the example illustrated in FIG. 6, but are not limited to those illustrated in FIG. 6. The predicted weather amounts may be, for example, wind direction and sunshine duration.

The numerical weather predictor 102 does not necessarily need to be provided in the present device. In this case, weather prediction data is acquired from an external weather prediction server, and the acquired weather prediction data is stored in the data storage 104.

The data storage 104 stores calendar data in addition to trade result data, electric power generation result data, and weather prediction data described above.

The calendar data stores calendar information including year, month, day, property information. The property information is, for example, day of week. The property information is, for example, classification information that distinguishes whether a day is a weekday, a holiday, or a public holiday. The property information is, for example, the name of a public holiday. The property information is, for example, time slots such as daytime, late-evening, and commute time. The property information is, for example, season information (summer season or winter season). The property information is, for example, event information of a large-scale sport event, a festival, and the like.

The data storage 104 associates and accumulates, as case data, trade result data of a plurality of electric power markets, electric power generation result data, numerical weather prediction data, calendar data (for example, day of week and classification information).

The inputter 105 receives various instructions or data input operations from a user of the present device. The user is, for example, the operator or administrator of the present device. Examples of data input by the user include a condition such as a parameter needed for processing at the present device.

Examples of instructions input by the user include an instruction for an operation related to data visualization. The inputter 105 is achieved by, for example, a mouse, a keyboard, a touch panel, a trackball, a joystick, a pen tablet, a voice recognition device, an image recognition device, or a combination of these devices. The inputter 105 may be an information terminal such as a personal computer, a tablet, a smartphone, or a cellular phone. Only one inputter 105 is illustrated in FIG. 1, but a plurality of inputters 105 may be provided.

The outputter 115 is a device configured to output input data. The outputter 115 is, for example, a display device capable of displaying data. In this case, the outputter 115 may be, for example, a liquid crystal display, an organic electroluminescence display, a light emitting diode (LED) display, a cathode ray tube (CRT) display, or a projector, or may be of another scheme. The outputter 115 may be a printer configured to print data on a sheet or may be a transmission device configured to transmit data in a wireless or wired manner. In the following description, a case in which the outputter 115 is a display device is assumed.

The inputter 105 and the outputter 115 may be integrally configured as a personal computer, a tablet, a smartphone, or the like. One or both of the inputter 105 and the outputter 115 may be integrally configured with the present device.

The predictor 106 generates, based on case data stored in the inputter 105 and the data storage 104, a prediction value of the generated energy volume of a variable resource, a prediction value of the market price in each electric power market as a target of electric power buying and selling, and a plurality of pieces of prediction data of the bidding distribution situation (operation pattern) in the balancing market. Hereinafter, prediction data is also simply referred to as prediction. The predictor 106 stores the plurality of pieces of generated prediction data in the temporary storage 109. A prediction method is a method developed mainly in the field of weather prediction and called ensemble prediction, the method calculating a prediction value by simultaneously performing simulations on a value having uncertainty based on a plurality of cases. In addition, there is a method called analog ensemble, the method directly using, as a prediction value, result data of a past day and time slot having similar conditions. Alternatively, for example, multiple regression, neural network, a generalized addition model, sparse modeling, or deep learning may be used.

Prediction data may be separately generated by prediction related to an electric power market and prediction related to electric power generation. In this case, the number of pieces of data may be different between both prediction data.

FIG. 7 schematically illustrates an example of a plurality of predictions generated by the predictor 106. In this example, R predictions are generated. Each prediction has 48 time slots in the units of 30 minutes and has a plurality of prediction values for each time slot. In this example, predictions related to an electric power market and predictions related to electric power generation are integrally generated. Both predictions may be separately generated as described above.

A spot market price prediction value is a prediction value of the trade price in the spot market on a trade target day of the spot market, the value being predicted before the trade target day (for example, on the previous day).

An intraday market price prediction value is a prediction value of the trade price in the intraday market, the value being predicted on the previous day of the trade target day of the spot market or right before the trade closing time of the intraday market (a certain duration such as 10 minutes or one hour before a trade target time frame).

A PV-generated energy volume prediction value is a prediction value of a PV-generated energy volume, the value being predicted on the previous day of the trade target day of the spot market or right before the trade closing time of the intraday market (a certain duration such as 10 minutes or one hour before a trade target time frame). A wind-generated energy volume prediction value is a prediction value of a wind-generated energy volume, the value being predicted on the previous day of the trade target day of the spot market or right before the trade closing time of the intraday market (a certain duration such as 10 minutes or one hour before a trade target time frame).

The predictor 106 generates, as a prediction value of the bidding distribution situation (operation pattern) in the balancing market, a plurality of sets of predictions, each set consisting of predictions of one day, in a format same as that of result data of the balancing market for one day. The prediction value of the bidding distribution situation (operation pattern) can be calculated by using the ensemble prediction, the multiple regression, the neural network, the generalized addition model, the sparse modeling, the deep learning, or the like as described above. Alternatively, the analog ensemble using an actual value of a past similar day (for example, a past day to which at least one of weather and calendar properties is identical or similar) may be used.

FIG. 8 illustrates an example in which the prediction value of the operation volume and the prediction value of the average price in each time slot are included in predictions 1 to R in FIG. 7.

The score calculator 107 calculates, for a set of prediction values of predictions in each time slot (each row), weight coefficients (scores) corresponding to certainty. For example, when values of past date and time having similar conditions are directly used as prediction values, the score of each prediction value is set to be smaller as the number of days back to the day of the prediction value is larger. When a model is used for calculation of prediction values, the accuracy of the model may be calculated and each score may be set to be larger as the calculated accuracy is higher. The scores may be normalized over a plurality of predictions. For example, the scores are normalized so that the sum of the scores of a plurality of predictions is equal to one. The described score calculation method is exemplary and any other method may be used.

The score calculator 107 may be omitted. In this case, the weights of all prediction values may be equal.

The temporary storage 109 stores a plurality of predictions generated by the predictor 106 in the temporary storage 109.

The temporary storage 109 also stores the scores of the predictions in each time slot, which is calculated by the score calculator 107.

The imbalance penalty acquirer 108 acquires, from an external server, actual past values of various parameters necessary for calculation of an imbalance adjustment cost (penalty) received when imbalance (overage and shortage of the amount of supplied electric power) has occurred. The imbalance penalty acquirer 108 stores the acquired parameters in the temporary storage 109. A method of calculating the imbalance penalty is determined in advance and not limited to particular method and contents.

An exemplary method of calculating the imbalance adjustment cost will be described below.

$$\text{Insufficient imbalance price} = \text{Weighted average value of spot market and intraday market} \times \alpha + B + K \quad \text{Expression (1)}$$

$$\text{Surplus imbalance price} = \text{Weighted average value of spot market and intraday market} \times \alpha + B + L \quad \text{Expression (2)}$$

Expression (1) is an expression used when the amount of supplied electric power is insufficient (when the sum of the amounts of electric power generated by the variable resource and the regulatable resource is insufficient for the planned value submitted to the system management company by the aggregator in advance). Expression (2) is an expression used when the amount of supplied electric power is excessive (when the sum of the amounts of electric power generated by the variable resource and the regulatable resource exceeds the planned value submitted to the system management company by the aggregator in advance).

In Expressions (1) and (2), "α" is an adjustment term in accordance with a supply-demand situation of the entire electric power system. The parameter "β" is an adjustment term that reflects a market price difference among areas. The parameter "β" is determined, for example, for each month and each area. The parameters "K" and "L" are incentive constants determined for each area (each general electric power transmission and distribution business operator). The parameter "K" is a constant when electricity is supplied. The parameter "L" is a constant when electricity is bought. Any parameter other than "K" and "L" is reviewed as needed with taken into consideration the situation of imbalance occurrence in the entire market, and an accurate value thereof is published at a timing after trading. Thus, in subsequent calculation, it is premised that the latest published actual values of past parameters is used in calculation that estimates the imbalance penalty.

The examples of Expressions (1) and (2) are imbalance penalty price formulae actually used in Japan. The imbalance penalty price formulae are scheduled to be reviewed in the future and thus are not limited to the examples in the present invention.

The temporary storage 109 stores various parameters necessary for calculation of the imbalance adjustment cost, which are acquired by the imbalance penalty acquirer 108.

The regulatable resource information storage 110 stores information on a power source corresponding to the regulatable resource such as biogas electric power generation. For example, the following information related to each power source is stored.

1. Power source ID
2. Power source type
3. Cost price [yen/kW]: contracted buying cost price 4. Maximum capacity [kW]: contracted rated electric power
5. Minimum capacity [kW]: needed only when output electric power can be adjusted
6. Contract time slot: contracted time slot
7. Fixed cost [yen/time slot]

A decision-making problem of interest will be described below by using expressions. Expression (3) is a formula for a risk-return evaluation value of the total profit of the entire trade at a decision-making timing on the previous day. Expression (4) is a formula for a risk-return evaluation value of the total profit except for that of the balancing market at a decision-making timing on a day of interest. In the following description, an hour-ahead market and an intraday market are names of the same market.

$$\text{MAX risk-return evaluation value of total profit at timing of previous day} = \text{MAX} R\left[S1(P3, B3, G3) + \sum_{n=1}^{A}(S2(B_n, B3, G_n) - S3(B_n, B3, G_n) + S4(B_n, R_n, P1_n, P2_n))\right]$$

Expression (3)

A: total number of time frames of one day
S1(P3, B3, G3): profit (yen) in the balancing market
S2(Bn, B3, Gn): imbalance payment (yen) in time frame n
S3(Bn, B3, Gn): total cost price (yen) in the spot market and the hour-ahead market in time frame n
S4(Bn, Rn, P1n, P2n): total sales (yen) in the spot market and the hour-ahead market in time frame n

[Decision Variables]
P3: bid price (yen/kWh) in the balancing market
B3: bid amount (kWh/time frame) in the balancing market
Bn: sum (kWh) of bid amounts in the spot market and the hour-ahead market in time frame n, which is subjected to decision-making at the timing of the previous day
Rn: ratio of the bid amount in the spot market relative to the sum of bid amounts in the spot market and the hour-ahead market in time frame n, which is subjected to decision-making at the timing of the previous day

[Variables for which Uncertainty Needs to be Considered]
G3: total energy selling volume (kWh) in the balancing market for one day
Gn: generated energy volume (kWh) of the variable resource in time frame n, which is predicted at the timing of the previous day
P1n: market price (yen/kWh) in the spot market in time frame n, which is predicted at the timing of the previous day
P2n: market price (yen/kWh) in the hour-ahead market in time frame n, which is predicted at the timing of the previous day When R is an expectation value, each term can be individually calculated according to addition rules. When a risk index (average value of lower-level percentiles) is included in a risk-return index, the entire occurrence probability is the product of the occurrence probability (percentile ratio) of an event of each term.

$$\text{MAX expectation value of total profit at timing of day of interest} = R\left[\sum_{n=1}^{A}(S2'(B'_n, G'_n) - S3'(B'_n, G'_n) + S4'(B'_n, P2'_n))\right]$$

Expression (4)

A: total number of time frames of one day
S2'(B'n, G'n): imbalance payment (yen) in time frame n
S3'(B'n, G'n): total cost price (yen) in the spot market and the hour-ahead market in time frame n
S4'(B'n, P2'n): total sales (yen) in the spot market and the hour-ahead market in time frame n

[Decision Variables]
B'n: sum (kWh) of bid amounts in the spot market and the hour-ahead market in time frame n after intraday correction [Variables for which uncertainty needs to be considered]
G'n: generated energy volume (kWh) of the variable resource in time frame n, which is predicted at the timing of the day of interest
P2'n: market price (yen/kWh) in the hour-ahead market in time frame n, which is predicted at the timing of the day of interest The bid price and the bid amount in the balancing market and the bid amount in the spot market are already determined.

It is an objective of the present embodiment to determine each following value so that the total profit is maximized.
[1] Bid price (yen/kWh) in the balancing market
[2] Bid amount (kWh/time frame) in the balancing market
[3] Sum (kWh) of bid amounts in the spot market and the hour-ahead market (generated energy volume planned value submitted to a system administrator at the timing of the previous day) in each time frame at the timing of the previous day
[4] Ratio of the bid amount in the spot market relative to the sum of bid amounts in the spot market and the hour-ahead market in each time frame at the timing of the previous day
[5] Sum (kWh) of bid amounts in the spot market and the hour-ahead market (generated energy volume planned value finally submitted to the system administrator) in each time frame after intraday correction Expression (3) is an objective function of decision-making at the timing of the previous day and determines the above-described [1] to [4]. In decision-making on any of the timing of the previous day and the timing of the day of interest, the sum of bid amounts in the spot market and the hour-ahead market is submitted to the system administrator as the generated energy volume planned value in each time frame.

The profit of the aggregator by trading for one day is a value obtained by adding up, for the 48 time frames, a value obtained by subtracting the total cost price of electric power selling in the spot market and the hour-ahead market from the sum of the profit in the balancing market, the total sales in the spot market and the hour-ahead market, and the imbalance payment (imbalance penalty payment). When the balancing market is not taken into consideration, "S1" in Expression (3) and the above-described [1] and [2] are excluded.

However, in the present embodiment, the risk-return evaluation value of the total profit is maximized for decision-making with taken into account influence of probabilistic variation of the following values.

1. Total energy selling volume (kWh) in the balancing market for one day
2. Generated energy volume (kWh) of the variable resource in each time frame
3. Market price (yen/kWh) in the spot market in each time frame
4. Market price (yen/kWh) in the hour-ahead market in each time frame The risk-return evaluation value indicates the expectation value of the profit or the average value of a lower-level percentile, and a specific calculation method thereof will be described later. In Expression (3), when the risk-return index R is the expectation value, additivity of the expectation value allows integration of the risk-return evaluation values individually calculated for the partial problems of S1, S2, S3, and S4 in the objective function. When the risk-return index includes the risk index (such as the average value of the lower-level percentile), the product of the occurrence probabilities (percentile ratios) of calculated values of the respective terms indicates the occurrence probability of the risk-return evaluation value as the sum of the terms.

Expression (4) indicates decision-making after a new prediction value is acquired right before the trade closing time of the intraday market (a certain duration such as 10 minutes or one hour before a trade target time frame). Similarly to calculation for the previous day, the profit of the aggregator by trading for one day is a value obtained by adding up, for the 48 time frames, a value obtained by subtracting the total cost price of electric power selling in the spot market and the hour-ahead market from the sum of the total sales in the spot market and the hour-ahead market and the imbalance payment (imbalance penalty payment).

Similarly to the previous day, the risk-return evaluation value of the total profit is maximized for decision-making with taken into account influence of probabilistic variation of the following values.

[1] Generated energy volume (kWh) of the variable resource in each time frame
[2] Market price (yen/kWh) in the hour-ahead market in each time frame Similarly to Expression (3), in Expression (4), when the risk-return index R is the expectation value, additivity of the expectation value allows integration of the risk-return evaluation values individually calculated for the partial problems of S2', S3', and S4' in the objective function.

Each partial problem will be described below.

The description will be first made on the procedure of determining the ratio ("Rn" in Expression (3)) of the bid amount in the spot market relative to the sum of bid amounts in the spot market and the hour-ahead market in each time frame at the timing of the previous day.

The bidding content determiner 113 determines the ratio (bid amount ratio) of the amount of electric power traded (bid) in each of the spot market and the intraday market. This determination is performed before the gate close time (bidding deadline time) of the spot market. First, the bidding content determiner 113 tentatively sets each bid amount ratio.

An exemplary method of tentatively setting the bid amount ratios is what is called grid search that divides 1.0 into equal intervals and exhaustively searches for all combinations of the bid amount ratios so that the sum of the bid amount ratios of the electric power markets is equal to one. For example, there are two kinds of electric power trade markets, and the bid amount ratios of the respective electric power markets are expressed as "(the ratio of the spot market, the ratio of the intraday market)". In a case of 10 divisions, 10 ratio combinations are searched as described below.

(1.0,0.0)→(0.9,0.1)→(0.8,0.2)→ ... →(0.0,1.0)

Other methods of searching for ratio combinations include a hill climbing method, a simulated annealing method, a genetic algorithm, and a particle swarm optimization (PSO). For example, the hill climbing method randomly changes the ratio of each market set in the previous loop by a small amount, and employs the ratio after the change when an index (such as the risk-return index to be described later) is improved, or returns to the ratio before the change otherwise. The simulated annealing method probabilistically employs the ratio after the change even when the risk-return index is not improved. The present embodiment is not limited to a particular ratio searching method.

The bid amount ratio of each electric power market for a target time slot (bidding unit time frame) is specified to the yield calculator 112. The yield calculator 112 calculates (predicts), based on a plurality of price prediction values stored in the temporary storage 109, an evaluated price when it is assumed that electric power is bid in each electric power market at a corresponding tentative bid amount ratio. The plurality of price prediction values include a spot market price prediction value and an intraday market price prediction value. The evaluated price is, for example, sales (corresponding to S4 in Expression (3)).

The index calculator 111 generates, for a target time slot, yield distribution (yield pseudo probability distribution) as distribution of sales prediction values on a plurality of pieces of prediction data. The index calculator 111 calculates, based on the pseudo probability distribution, the risk-return index when electric power is bid at the corresponding tentative bid amount ratio. Only prediction values of the market price in the spot market and the market price in the hour-ahead market in each time frame may be used for calculation of the risk-return index.

Figure 9:
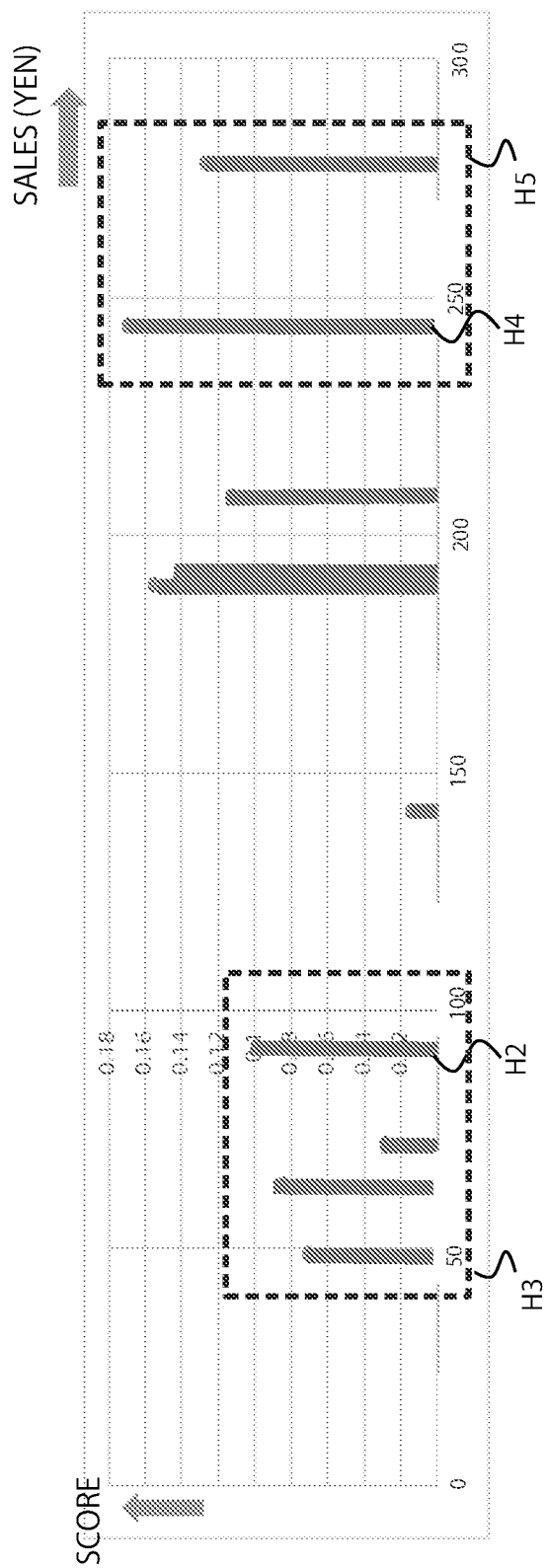
FIG. 9 is a diagram illustrating an example of pseudo probability distribution of a yield when trading is executed at a tentative bid amount ratio in each electric power market.

FIG. 9 illustrates, for a target time slot, exemplary pseudo probability distribution of sales when trading is performed at a tentative bid amount ratio in each electric power market to sell an optional total amount of electric power. The horizontal axis represents sales calculated from the prediction value for each market price (trade price). The vertical axis represents the score of prediction data.

For a first example of the risk-return index, a weighted average value of the scores of sales in pieces of prediction data for a target time slot is calculated as the expectation value of sales. A calculation formula is expressed as Expression (4a).

$$R[S4(B_n, R_n, P1_n, P2_n)] = B_n \times \sum_{l=1}^{L} W2_{n,l}(R_n \times P1_{n,l} + (1 - R_n) \times P2_{n,l})$$

Expression (4a)

Bn: sum (kWh) of bid amounts in the spot market and the hour-ahead market in time frame n
Rn: ratio of the bid amount in the spot market relative to the sum of bid amounts in the spot market and the hour-ahead market in time frame n
l: ID of the prediction value of the market price
L: the number of prediction values of the market price Rn: ratio of the bid amount in the spot market relative to the sum of bid amounts in the spot market and the hour-ahead market in time frame n P1n,I: I-th previous-day prediction value (yen/kWh) of the market price in the spot market in time frame n P2n,I: I-th previous-day prediction value (yen/kWh) of the market price in the hour-ahead market in time frame n W2n,I: weight of a prediction value k in time frame n The weight W2n,I is normalized to have $$\sum_{l=1}^{L} W2_{n,l} = 1$$

In Expression (4a), the term on the right side of "Bn" is the average market price of the spot market and the hour-ahead market in time frame n.

The weight (score) W2n,I of the prediction value I in time frame n is normalized for each time frame n so that its sum over all pieces of prediction data is equal to one, and it is regarded that the weight corresponds to the frequency of the trade price (actual value).

For a second example of the risk-return index, the sum of weights (scores) is sequentially calculated for prediction data in ascending order of yield in the pseudo probability distribution. A prediction data group is specified for which the sum of scores is equal to a lower-level percentile as a reference value (first reference value) or is smaller than a lower-level percentile (or equal to or larger than the lower-level percentile) and closest to the lower-level percentile. Then, the yield (lower-level percentile yield) of prediction data, which is highest in the specified prediction data group is calculated as the risk-return index. FIG. 9 illustrates prediction data H2 corresponding to the index (the risk-return index of the second example) of a lower 30 percentile yield. In other words, the yield of prediction data H2 corresponds to the risk-return index of the second example. In this manner, the scores of a plurality of pieces of prediction data are added in ascending order of yield corresponding to the prediction data, and the risk-return index of the second example is calculated based on the yield of prediction data for which the sum value of the scores is equal to or closest to the first reference value.

For a third example of the risk-return index, a prediction data group in a range from the lower level of the yield to a lower-level percentile (or less than the lower-level percentile) is specified by using a lower-level percentile as a reference value (second reference value). The risk-return index is set to a yield average (lower-level percentile expectation value) of the specified prediction data group. FIG. 9 illustrates a case of lower 30 percentile with a prediction data group H3 for which the index (the risk-return index of the third example) of a lower 30 percentile expectation value is calculated. The risk-return index is set to be a weighted yield average of the prediction data group H3.

$$R[S4(B_n, R_n, P2_n)] = B_n \times \sum_{l=1}^{1/T2} W2_{n,l} \times \sum_{l=1}^{T2} W2_{n,l}(R_n \times P1_{n,l} + (1-R_n) \times P2_{n,l}) \quad \text{Expression (4b)}$$

T2: the number of predictions included in the lower-level percentile

When the risk-return index is a percentile, the product of the occurrence probabilities (percentile ratios) of the events of S1 to S4 can be regarded as a total occurrence probability.

In Expression (4b), predictions "I" are sorted in ascending order of yield. The number T2 corresponds to the number of pieces of prediction data equal to or less than the lower-level percentile. The other symbols are same as those in the above-described expressions. In this manner, the scores of a plurality of pieces of prediction data are added in ascending order of yield corresponding to the prediction data, and the risk-return index of the third example is calculated based on the sales of similar case data for which the sum value of the scores is equal to or closest to the second reference value.

For a fourth example of the risk-return index, the sum of scores, is sequentially calculated for prediction data in descending order of sales in the pseudo probability distribution. A prediction data group is specified for which the sum of scores is equal to a higher-level percentile as a reference value (third reference value) or is equal to or larger than the higher-level percentile (or smaller than the higher-level percentile) and closest to the higher-level percentile. The risk-return index is set to be the sales (higher-level percentile sales) of prediction data, which is lowest in the specified prediction data group. Prediction data H4 corresponding to the index (the risk-return index of the fourth example) of a higher 30 percentile sales is illustrated. In other words, the sales of prediction data H4 corresponds to the risk-return index of the fourth example. In this manner, the scores of a plurality of pieces of prediction data are added in descending order of sales corresponding to the prediction data, and the risk-return index of the fourth example is calculated based on the sales of prediction data for which the sum value of the scores is equal to or closest to the third reference value.

For a fifth example of the risk-return index, a prediction data group in a range from the higher level of sales to a higher-level percentile as a reference value (fourth reference value) (or less than the higher-level percentile) in the pseudo probability distribution is specified. The risk-return index is set to be a sales average (higher-level percentile expectation value) of the specified prediction data group. Prediction data H5 for which the index (the risk-return index of the fifth example) of a higher 30 percentile expectation value is calculated is illustrated. The risk-return index is set to be a weighted sales average of the prediction data group H5. A calculation formula of the risk-return index of the fifth example is same as Expression (2). However, prediction data "I" is sorted in descending order of sales. The number T2 corresponds to the number of pieces of prediction data equal to or less than the higher-level percentile. In this manner, the scores of a plurality of pieces of prediction data are added in descending order of sales corresponding to the prediction data, and the risk-return index of the fifth example is calculated based on the yield of prediction data for which the sum value of the scores is equal to or closest to the fourth reference value.

The strategy determiner 114 determines, for a bidding unit time frame (time slot) as a trade target, a risk-return index to be used in accordance with an electric power selling strategy, and provides the risk-return index to the bidding content determiner 113.

A trade strategy has, for example, one-to-one correspondence with a risk-return index. The strategy determiner 114 may acquire, from the inputter 105, information that specifies a trade strategy and determine the trade strategy specified by the acquired information. Alternatively, the strategy determiner 114 may specify the trend of the market price in a past time slot same as a target bidding unit time frame (time slot) and determine a trade strategy in accordance with the trend. For example, the latest moving average value of the market price in a typical market (for example, the spot market in a case of JEPX) increases (increase trend), decreases (decrease trend), or slightly changes (flat or leveled). Alternatively, for example, the moving average value of the sum of the market prices in a plurality of target electric power markets (for example, the spot market and the intra-day market) increases (increase trend), decreases (decrease trend), or slightly changes (flat or leveled). A risk-taking strategy is selected when the market price is in the increase trend, a risk-off strategy is selected when the market price is in the decrease trend, or a standard strategy is selected when the market price is stable.

The index calculator 111 determines a risk-return index in accordance with the trade strategy determined by the strategy determiner 114 and calculates the determined risk-return index. For example, when the trade strategy determined by the strategy determiner 114 is the standard strategy, the risk-return index of the first example (the weighted average value with scores) is used. When the trade strategy is the risk-off strategy, the risk-return index of the second example (the yield of the lower-level percentile) or the risk-return index of the third example (lower-level percentile expectation value) is used. When the trade strategy is the risk-taking strategy, the risk-return index of the fourth example (higher-level percentile yield) or the risk-return index of the fifth example (higher-level percentile expectation value) is used.

The kind of selectable trade strategy and the kind of risk-return index may be other kinds and are not particularly limited in the present embodiment. For example, a plurality of higher-level percentile values such as 30, 40, and 50 may be set and selectable as different trade strategies. Similarly, a plurality of lower-level percentile values may be set and selectable as different trade strategies.

The bidding content determiner 113 determines the bid amount ratios for electric power markets, which maximize or minimize a risk-return index.

No strategy determiner 114 may be provided. In this case, the bidding content determiner 113 determines bid amounts that maximize or minimize a risk-return index specified in advance.

Subsequently, the procedure of determining the bid price and the bid capacity ("P3" and "B3" in Expression (3)) bid in the balancing market will be described below.

The bidding content determiner 113 determines the bid price and the bid capacity in the balancing market based on the prediction value of the operation volume and the prediction value of the average price (refer to FIG. 8) in the balancing market for one day. This determination is performed before the gate close time (bidding deadline time) of the balancing market.

First, the bidding content determiner 113 tentatively sets the bid capacity and the bid price (unit supply price) for a target day. The tentatively set bid capacity is referred to as tentative bid capacity, and the tentatively set bid price is referred to as a tentative bid price.

An exemplary method of setting the tentative bid capacity and the tentative bid price is grid search that divides the range between upper and lower limit values of each of the capacity and the price into equal intervals and exhaustively searches for all combinations of the tentative capacity and the tentative price. For example, when the tentative capacity is changeable in the range of 1 to 2 MW and the tentative price is changeable in the range of 100 to 200 yen, $10^2$ combinations are searched in a case of 10 divisions as described below. Each combination is expressed as "(the tentative bid capacity, the tentative bid price)". However, as described later, this search is performed in combination with search for a total bid amount in the spot market and the hour-ahead market.

$(1,100) \rightarrow (1,110) \rightarrow (1,120) \rightarrow \ldots \rightarrow (2,190) \rightarrow (2,200)$ Other methods of searching for ratio combinations include the hill climbing method, the simulated annealing method, the genetic algorithm, and the particle swarm optimization (PSO) described above.

The tentative bid capacity and the tentative bid price for a target day are specified to the yield calculator 112. The yield calculator 112 calculates (predicts), based on the prediction value of the operation volume and the prediction value of the average unit price in the balancing market for each time slot of a plurality of days (predictions), which are stored in the temporary storage 109, a yield when it is assumed that bidding is performed in the balancing market at the tentative bid capacity and the tentative bid price. An exemplary method of calculating the operation volume (trade amount) when the prediction value of the total operation volume and the prediction value of the average price in each time slot can be obtained will be described below with reference to FIG. 10.

Figure 10:
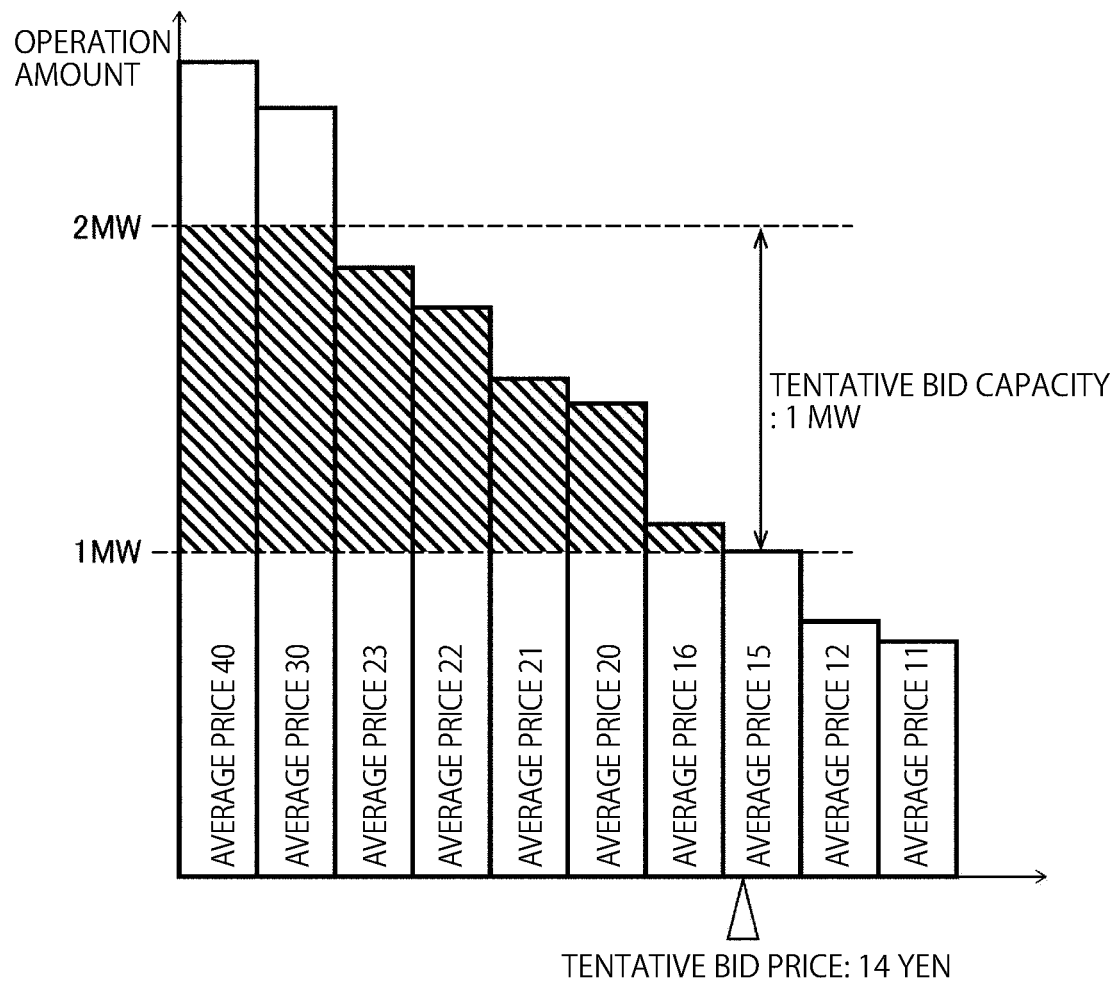
FIG. 10 is a diagram in which time slots of a day (prediction) are arranged in descending order of the operation volume from the left side.

In FIG. 10, time slots of a day (prediction) are arranged from the left side in descending order of the operation volume. One day is divided into 48 time slots in FIG. 8 described above, but in this example, one day is divided into 10 time slots for description. The system operator instructs, by using a supply merit order list in which confirmed power sources are arranged in order of unit supply price, the power source business operator side to perform supply up to a necessary amount of regulation at each time section. In this case, in a time slot in which the operation volume is larger, a power source business operator having bid at a higher price operates, and thus the average price is basically higher. This characteristic is used to first calculate an operation volume P in a time slot in which the average unit price is higher than the tentative bid price and the operation volume is minimum (1 MW for average price 15 in the illustrated example). Then, any time slot in which bidding at a bid price higher than the tentative bid price is certainly operated (time slot in which the average unit price is higher than the tentative bid price) is extracted, and a value obtained by subtracting the above-described P (1 MW) from the operation volume in each extracted time slot is calculated as the own (aggregator) operation volume. The tentative bid capacity serves as an upper limit for any time slot in which the operation volume exceeds the tentative bid capacity (in the illustrated example, 1 MW). A hatched part in FIG. 10 corresponds to an operation volume when the tentative bid price is 14 yen and the tentative bid capacity is 1 MW.

In this manner, the operation volume for each prediction (day) is calculated by using the prediction value of the operation volume and the prediction value of the average price in the balancing market in each time slot. The method of calculating the operation volume is not limited to the present method.

The score (weight) of each prediction (day) is regarded as frequency. Relation data is generated in which the frequency of each prediction and the evaluated price (in this example, the yield) corresponding to the prediction are associated with each other. In the present example, the score is regarded as occurrence probability (generation frequency), and probability distribution (pseudo probability distribution) in which the evaluated price and the probability are associated with each other is generated. The pseudo probability distribution is calculated for each of a plurality of tentative bidding contents (combinations of the tentative bid capacity and the tentative bid price).

The evaluated price is, for example, a yield obtained by subtracting the procure cost of electric power of the regulatable resource, which is sold in the balancing market, from the sum of trade amounts (selling amounts) in the balancing market, which are obtained by multiplying the calculated operation volume by the tentative bid price for each time slot. In this case, pseudo probability distribution in which the yield and the probability (frequency) are associated with each other is produced.

Figure 11:
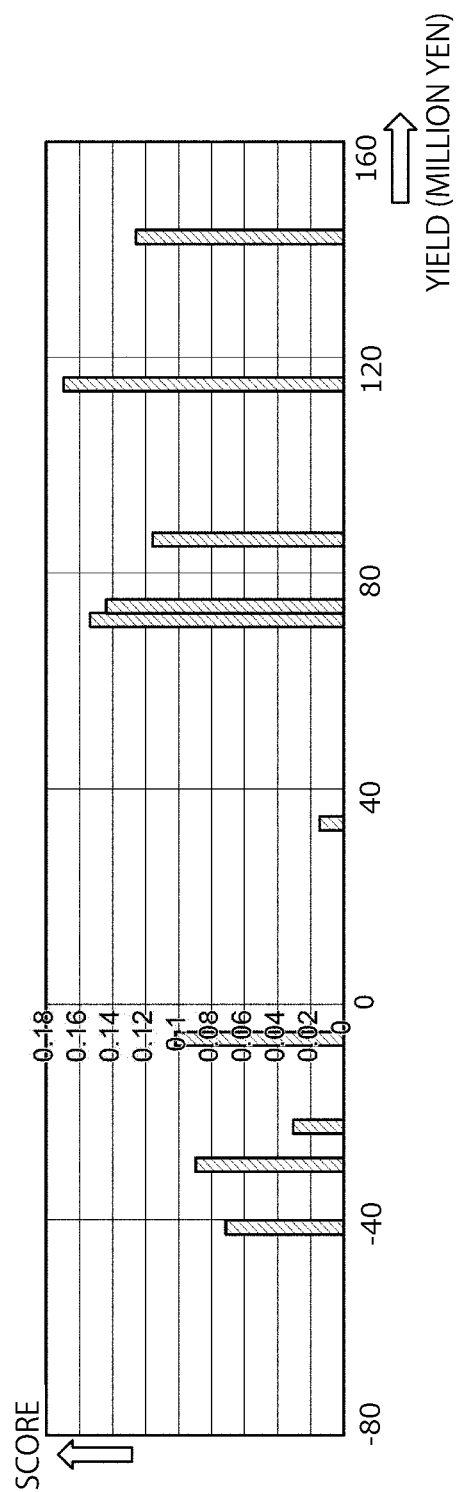
FIG. 11 is a diagram illustrating an example of pseudo probability distribution of a yield.

FIG. 11 is a diagram illustrating an example of the pseudo probability distribution of the yield. The horizontal axis represents the yield calculated by the above-described method. The vertical axis represents the score of each prediction.

The index calculator 111 calculates a risk-return index based on relation data (pseudo probability distribution) of the yield calculated by the yield calculator 112 and the score. Calculation of the risk-return index uses only the prediction value of the operation volume and the prediction value of the average unit price in each time slot of a plurality of days (predictions). The value (Rm(P3, B3) in Expression (3)) of the operation volume calculated by the above-described method may be used. Similarly to the above description, the risk-return index may be calculated as the risk-return index of any of the first to fifth examples. Methods of calculating the risk-return indexes of the first to fifth examples are basically same as the above-described contents, and thus will be briefly described below.

For the first example of the risk-return index, a weighted average value of the scores of yields calculated from pieces of prediction data is calculated as the expectation value of the yield. A calculation formula is expressed as Expression (5a).

$$R[S1(P3, B3, G3)] = \sum_{m=1}^{M} (W3_m(P3 - PG) \times R_m(P3, B3))$$ Expression (5a)

P3: bid price (yen/kWh) in the balancing market; P3>PG
B3: bid amount (kWh/time frame) in the balancing market; 0≤B3≤G2max
G2max: maximum generated energy volume (kWh) of the regulatable resource
G3: total energy selling volume (kWh) in the balancing market for one day
PG: original unit price (yen/kWh) of electric power of the regulatable resource
m: prediction value ID of a bidding pattern
M: the number of prediction values of the bidding pattern
Rm(P3, B3): total energy selling volume (kWh) in the balancing market for one day in a case of bidding with P3 and B3, which is calculated from the prediction value "m" of the bidding pattern
W3m: weight of the prediction value "m"
W3m is normalized so that:

$$\sum_{m=1}^{M} W3_m = 1$$

In other words, the weight (score) "W3m" is normalized so that its sum over all pieces of prediction data is equal to one as described above. In this manner, the risk-return index of the first example can be calculated based on a weighted yield average value corresponding to prediction data.

For the second example of the risk-return index, the sum of scores is sequentially calculated for prediction data in ascending order of yield in the pseudo probability distribution. A prediction data group is specified for which the sum of scores is equal to a lower-level percentile as a reference value (first reference value) or is smaller than the lower-level percentile (or equal to or larger than the lower-level percentile) and closest to the lower-level percentile. The yield (lower-level percentile yield) of prediction data, which is highest in the specified prediction data group is calculated as the risk-return index. In this manner, the scores of a plurality of pieces of prediction data are added in ascending order of yield corresponding to the prediction data, and the risk-return index of the second example is calculated based on the yield of prediction data for which the sum value of the scores is equal to or closest to the first reference value.

For the third example of the risk-return index, as in Expression (5b) below, a prediction data group in a range from the lower level of the yield to a lower-level percentile (or less than the lower-level percentile) is specified by using the lower-level percentile as a reference value (second reference value). The risk-return index is set to a yield average (lower-level percentile expectation value) of the specified prediction data group. In this manner, the scores of a plurality of pieces of prediction data are added in ascending order of yield corresponding to the prediction data, and the risk-return index of the third example is calculated based on the yield of similar case data for which the sum value of the scores is equal to or closest to the second reference value.

$$R[S1(P3, B3, G3)] = \sum_{m=1}^{1/T1} W3_m \sum_{m=1}^{T1} (W3_m(P3 - PG) \times R_m(P3, B3))$$ Expression (5b)

T1: the number of predictions included in the lower-level percentile

For the fourth example of the risk-return index, the sum of scores is sequentially calculated for prediction data in descending order of yield in the pseudo probability distribution. A prediction data group is specified for which the sum of scores is equal to a higher-level percentile as a reference value (third reference value) or is equal to or larger than the higher-level percentile (or smaller than the higher-level percentile) and closest to the higher-level percentile. The risk-return index is set to be the yield (higher-level percentile yield) of prediction data, which is lowest yield in the specified prediction data group. In this manner, the scores of a plurality of pieces of prediction data are added in descending order of yield corresponding to the prediction data, and the risk-return index of the fourth example is calculated based on the yield of prediction data for which the sum value of the scores is equal to or closest to the third reference value.

For the fifth example of the risk-return index, a prediction data group in a range from the higher level of yield to a higher-level percentile as a reference value (fourth reference value) (or less than the higher-level percentile) in the pseudo probability distribution is specified. The risk-return index is set to be a yield average (higher-level percentile expectation value) of the specified prediction data group. A calculation formula of the index of the fifth example is same as Expression (4). However, prediction data "m" is sequentially sorted in descending order of yield. The number "T" corresponds to the number of pieces of prediction data equal to or less than the higher-level percentile. In this manner, the scores of a plurality of pieces of prediction data are added in descending order of yield corresponding to the prediction data, and the risk-return index of the fifth example is calculated based on the yield of prediction data for which the sum value of the scores is equal to or closest to the fourth reference value.

Figure 12:
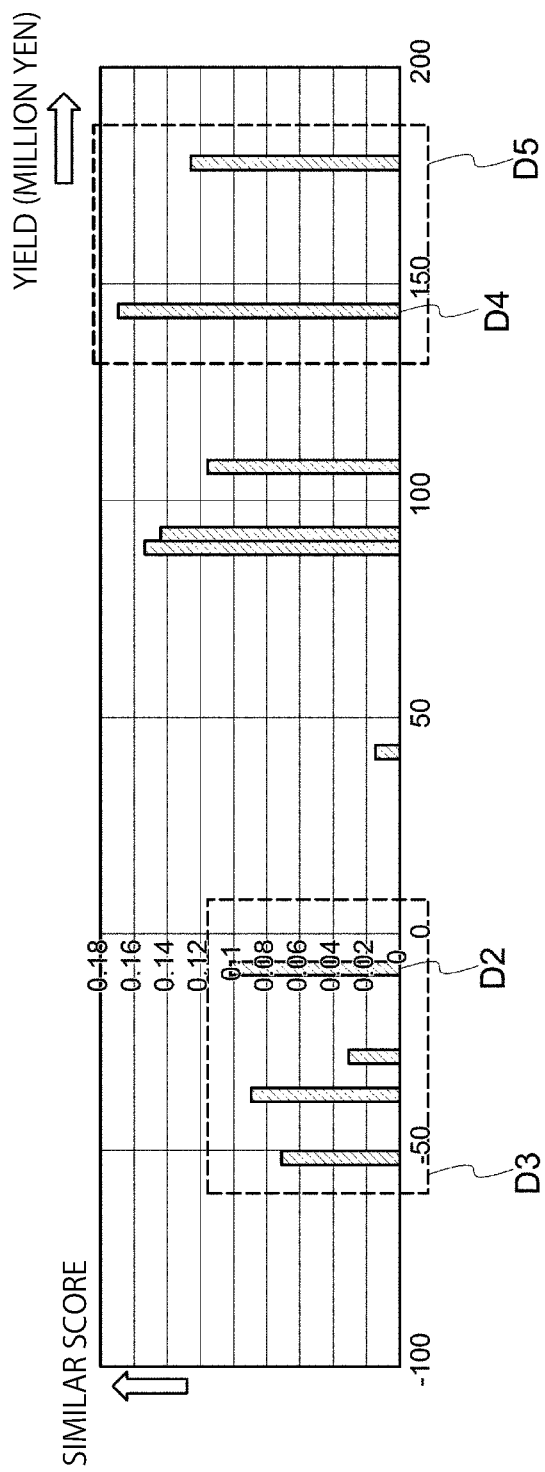
FIG. 12 is a diagram illustrating an example in which prediction data as a target of calculation of each index is specified in the pseudo probability distribution in FIG. 11.

FIG. 12 is a diagram illustrating exemplary specification of prediction data for which the risk-return indexes of the second to fifth examples are calculated in the pseudo probability distribution of FIG. 11. More specifically, prediction data D2 for which the index of the lower 30 percentile yield (the risk-return index of the second example) is calculated is illustrated on the left side in FIG. 12. In addition, prediction data D3 is illustrated for which the index of the lower 30 percentile expectation value (the risk-return index of the third example) is calculated in a case of the lower 30 percentile. Prediction data D4 for which the index of the higher 30 percentile yield (the risk-return index of the fourth example) is calculated is illustrated on the right side in FIG. 12. In addition, prediction data D5 is illustrated for which the index of the higher 30 percentile expectation value (the risk-return index of the fifth example) is calculated.

The strategy determiner 114 determines, for a trade target day, a risk-return index to be focused on in accordance with an electric power selling strategy, and provides the risk-return index to the index calculator 111. A trade strategy has, for example, one-to-one correspondence with the risk-return index. The strategy determiner 114 may acquire, from the inputter 105, information that specifies a trade strategy and determine the trade strategy specified by the acquired information.

Alternatively, the strategy determiner 114 may specify the trend of the market price and determine a trade strategy in accordance with the trend. For example, the latest moving average value of the market price in a typical market (for example, the spot market in a case of JEPX) increases (increase trend), decreases (decrease trend), or slightly changes (flat or leveled). Alternatively, for example, the moving average value of the sum of the average price in the balancing market for one day increases (increase trend), decreases (decrease trend), or slightly changes (flat or leveled). A risk-taking strategy is selected when the market price is in the increase trend, a risk-off strategy is selected when the market price is in the decrease trend, or a standard strategy is selected when the market price is stable.

The index calculator 111 determines a risk-return index in accordance with the trade strategy determined by the strategy determiner 114 and calculates the determined risk-return index. For example, details of the risk-return index are same as the above-described contents. Similarly to the above description, the kind of selectable trade strategy and the kind of risk-return index may be other kinds and are not particularly limited in the present embodiment.

The bidding content determiner 113 determines the bid capacity and the bid price (unit supply price) of bidding in the balancing market, which maximize or minimize a risk-return index.

No strategy determiner 114 may be provided. In this case, the bidding content determiner 113 determines the bid capacity and the bid price (unit supply price) that maximize or minimize a risk-return index specified in advance.

Subsequently, the procedure of determining the total bid amount (corresponding to "Bn" in Expression (3)) in the spot market and the intraday market will be described below.

The bidding content determiner 113 determines the total bid amount in the spot market and the intraday market based on the bid capacity for the balancing market and the bid amount ratios for the spot market and the intraday market. This determination is performed before the gate close time (bidding deadline time) of the spot market. The bid amount ratios ("Rn" in Expression (3)) for the spot market and the intraday market are determined by the above-described method in advance. The total bid amount is determined simultaneously with the bid capacity in the balancing market as described later. Alternatively, the range between upper and lower limit values of the bid amount is divided into equal intervals in advance, and the bid price with which an above-described risk-return value of the yield in the balancing market is maximized and the risk-return value are calculated and stored for each tentative capacity in advance. As for the imbalance penalty payment and the total cost price of electric power sold in the spot market and the intraday market, the total bid amount is determined with taken into account influence of uncertainty in the generated energy volume of the variable resource.

The prediction value of the generated energy volume of the variable resource (the prediction value of a generated energy volume in FIG. 7) in each prediction is acquired for a target time slot from the temporary storage 109. The imbalance payment and the total cost price in a trade target time slot are calculated based on the acquired prediction value and the above-described determined bid amount ratios. Calculation of a risk-return index for the imbalance payment and the total cost price may use only the prediction value of the generated energy volume of the variable resource in each time frame.

The risk-return index for the profit in the target time slot is calculated based on Expression (6) below. Then, the total bid amount is determined based on the risk-return index. For example, the range of the total bid amount is divided into a plurality of equal intervals, and all values are exhaustively searched. The risk-return index for each searched bid amount is calculated. For example, the total bid amount that minimizes or maximizes the risk-return index is determined. As described above, several kinds of methods are available for calculation of the risk-return index.

As described above, the total bid amount in the spot market and the hour-ahead market in each time frame is submitted to the system administrator as the generated energy volume planned value in the time frame. As in Expression (6), an imbalance occurrence amount and an imbalance penalty price in each time frame are determined based on the magnitude relation between the total bid amount in the spot market and the intraday market and an energy volume as the sum of the generated energy volume of the variable resource and the generated energy volume of the regulatable resource. The generated energy volume of the regulatable resource is adjusted in real time, depending on the generated energy volume of the variable resource. Expression (6) assumes that output of the generated energy volume of the regulatable resource is adjusted in real time in a direction in which the imbalance occurrence amount is compensated. However, a method of determining the generated energy volume of the regulatable resource is not limited to the present example.

$$R[S2(B_n, G_n)][S3(B_n, G_n)] = \sum_{k=1}^{K} W1_{n,k}(IM_{n,k} \times PE_{n,k} - G_{n,k} \times P_{var} - G2_{n,k} \times P_{con})$$ Expression (6)

If $G_{n,k} + G2_{max} - B3 < B_n$
  $IM_{n,k} = G_{n,k} + G2_{max} - B3 - B_n$
  $PE_{n,k} = PE_{minus}$
  $G2_{n,k} = G2_{max}$
Else If $G_{n,k} + G2_{min} > B_n$
  $IM_{n,k} = G_{n,k} + G2_{min} - B_n$
  $PE_{n,k} = PE_{PLUS}$
  $G2_{n,k} = G2_{min}$
Else
  $IM_{n,k} = 0$
  $PE_{n,k} = 0$
  $G2_{n,k} = G1_{n,k} - B_n$ The "If" clause describes a case of insufficient imbalance occurrence. The "Else If" clause describes a case of surplus imbalance occurrence.

IMn,k: imbalance occurrence amount (kWh) calculated based on the prediction value k in time frame n PEn,k: imbalance price (yen/kWh) calculated based on the prediction value k in time frame n Bn: sum (kWh) of bid amounts in the spot market and the hour-ahead market in time frame n; Bmin≤Bn≤Bmax B3: bid amount (kWh/time frame) in the balancing market k: ID of a previous-day prediction value of the generated energy volume of the variable resource K: the number of previous-day prediction values of the generated energy volume of the variable resource Gn,k: k-th prediction value (kWh) of the generated energy volume of the variable resource in time frame n G2n,k: generated energy volume of the regulatable resource (kWh) corresponding to the prediction value k in time frame n W1n,k: weight of the prediction value k in time frame n Pvar: electric power original unit price (yen/kWh) of the variable resource Pcon: electric power original unit price (yen/kWh) of the regulatable resource G2max: maximum generated energy volume (kWh) of the regulatable resource G2 min: minimum generated energy volume (kWh) of the regulatable resource PEplus: surplus imbalance price (yen/kWh)

PEminus: insufficient imbalance price (yen/kWh)

W1n,k is normalized so that:

$$\sum_{k=1}^{K} W1_{n,k} = 1$$

The strategy determiner 114 determines an electric power selling strategy (trade strategy) for a trade target time slot and provides the determined electric power selling strategy to the index calculator 111. Details of the trade strategy are as described above.

The index calculator 111 determines a risk-return index in accordance with the trade strategy determined by the strategy determiner 114. The index calculator 111 calculates the determined risk-return index for the above-described profit in the time slot. Details of the risk-return index are same as the above-described contents.

Lastly, correction of the sum of bid amounts in the spot market and the hour-ahead market in each time frame by using prediction values for a day of interest will be described below.

The predictor 106 calculates a plurality of predictions on the generated energy volume of the variable resource and a plurality of predictions on the price in the intraday market at a target date and time in a target area again. The predictions may be separately calculated for each of the generated energy volume and the price as described above. This prediction is performed, for example, before the gate close time of the intraday market. The prediction is performed, for example, T hours before the gate close of a target time frame in the intraday market. The prediction of the market price on the day of interest typically has accuracy higher than that of previous-day prediction by using information that can be acquired only on the day, for example, already agreed and published actual values of the market price in the spot market, already agreed actual values of the market price in continuous trading in the intraday market, and the like in a case of the prediction of the market price. Similarly, the prediction of the generated energy volume of the variable resource typically has accuracy higher than that of previous-day prediction by using actual values of the amount of generated electric power until right before the prediction and the like. The prediction is desirably performed at least by using information not used at the above-described prediction.

The prediction is not limited to a particular method but may be performed by the ensemble prediction, the analog ensemble, the neural network, the generalized addition model, the sparse modeling, the deep learning, or the like described above by using, for example, information that can be acquired only on the day of interest.

The bidding content determiner 113 corrects the bid amount in the intraday market. A risk-return index for a differential profit is calculated again by using a plurality of latest prediction values of the generated energy volume of the variable resource and a plurality of latest prediction values of the price in the intraday market while already determined variables (the bid price and the bid amount in the balancing market and the bid amount in the spot market) are fixed. A basic procedure is same as part of the above-described procedure of determining the sum of bid amounts in the spot market and the hour-ahead market in time frame n at the timing of the previous day. Specifically, a risk-return index for the total profit except for the profit in the balancing market is calculated again based on an expression below by using the latest prediction values. Then, the bid amount in the intraday market is determined (in other words, a correction value of the bid amount is determined) based on the risk-return index for the differential profit. For example, the range of the bid amount in the intraday market is divided into a plurality of equal intervals, and all values are exhaustively searched. The risk-return index for each searched bid amount is calculated. For example, the bid amount in the intraday market, which minimizes or maximizes the risk-return index is determined. Expressions (7a), (7b), and (8) are exemplary formulae of the risk-return index.

Expression (7a) is a formula of the total sales in time frame n (at intraday correction).

$$R[S4'(B'_n, P2'_n)] = \qquad \text{Expression (7a)}$$
$$R_n \times B_n \times P1 + (B'_n - R_n \times B_n) \times \sum_{l=1}^{L'} W2'_{n,l} \times P2'_{n,l}$$

Bn: sum (kWh) of bid amounts in the spot market and the hour-ahead market in time frame n, which is determined on the previous day B'n: sum (kWh) of bid amounts in the spot market and the hour-ahead market in time frame n after intraday correction Rn: ratio of the bid amount in the spot market relative to the sum of bid amounts in the spot market and the hour-ahead market in time frame n, which is determined on the previous day I: ID of an intraday prediction value of the market price L': the number of intraday prediction values of the market price P1: definite value (yen/kWh) of the market price in the spot market in time frame n P2n,l: l-th intraday prediction value (yen/kWh) of the market price in the hour-ahead market in time frame n W2'n,l: weight of an intraday prediction value k in time frame n W2'n,l is normalized so that:

$$\sum_{l=1}^{L'} W2'_{n,l} = 1$$

Expression (7b) is a formula of the total sales in time frame n (in a case of risk consideration).

$$R[S4'(B'_n, P2'_n)] = R_n \times B_n \times P1 + \qquad \text{Expression (7b)}$$
$$(B'_n - R_n \times B_n) \times \sum_{l=1}^{1/T2'} W2'_{n,l} \times \sum_{l=1}^{T2'} W2'_{n,l} \times P2'_{n,l}$$

T2': the number of predictions included in the lower-level percentile

Expression (8) is a formula of the imbalance payment and the total cost price in time frame n (at intraday correction).

$$R[S2'(B'_n, G'_n)] - R[S3'(B'_n, G'_n)] = \qquad \text{Expression (8)}$$
$$\sum_{k=1}^{K'} W1'_{n,k}(IM_{n,k} \times PE_{n,k} - G'_{n,k} \times P_{var} - G2_{n,k} \times P_{con})$$

If $G'_{n,k} + G2_{max} - B3 < B'_n$
  $IM_{n,k} = G'_{n,k} + G2_{max} - B3 - B'_n$
  $PE_{n,k} = PE_{minus}$
  $G2_{n,k} = G2_{max}$ Else If $G'_{n,k} + G2_{min} > B'_n$
  $IM_{n,k} = G'_{n,k} + G2_{min} - B'_n$
  $PE_{n,k} = PE_{PLUS}$
  $G2_{n,k} = G2_{min}$
Else
  $IM_{n,k} = 0$
  $PE_{n,k} = 0$
  $G2_{n,k} = G'_{n,k} - B'_n$ IMn,k: imbalance occurrence amount (kWh) calculated based on the prediction value k in time frame n PEn,k: imbalance price (yen/kWh) calculated based on the prediction value k in time frame n B'n: sum (kWh) of bid amounts in the spot market and the hour-ahead market in time frame n after intraday correction B3: bid amount (kWh/time frame) in the balancing market k: ID of an intraday prediction value of the generated energy volume of the variable resource K': the number of intraday prediction values of the generated energy volume of the variable resource G'n,k: k-th intraday prediction value (kWh) of the generated energy volume of the variable resource in time frame n G2n,k: generated energy volume of the regulatable resource (kWh) corresponding to the prediction value k in time frame n W1n,k: weight of the prediction value k in time frame n W1n,k is normalized so that:

$$\sum_{k=1}^{K'} W1'_{n,k} = 1$$

Pvar: electric power original unit price (yen/kWh) of the variable resource

Pcon: electric power original unit price (yen/kWh) of the regulatable resource

G2max: maximum generated energy volume (kWh) of the regulatable resource

G2 min: minimum generated energy volume (kWh) of the regulatable resource

PEplus: surplus imbalance price (yen/kWh)

PEminus: insufficient imbalance price (yen/kWh)

The strategy determiner 114 determines an electric power selling strategy (trade strategy) for a trade target time slot and provides the determined electric power selling strategy to the index calculator 111. Details of the trade strategy are as described above, and the trade strategy has, for example, one-to-one correspondence with the risk-return index.

The index calculator 111 determines a risk-return index in accordance with the trade strategy determined by the strategy determiner 114. The index calculator 111 calculates the determined risk-return index for the above-described differential profit. Details of the risk-return index are same as the above-described contents.

Figure 13:
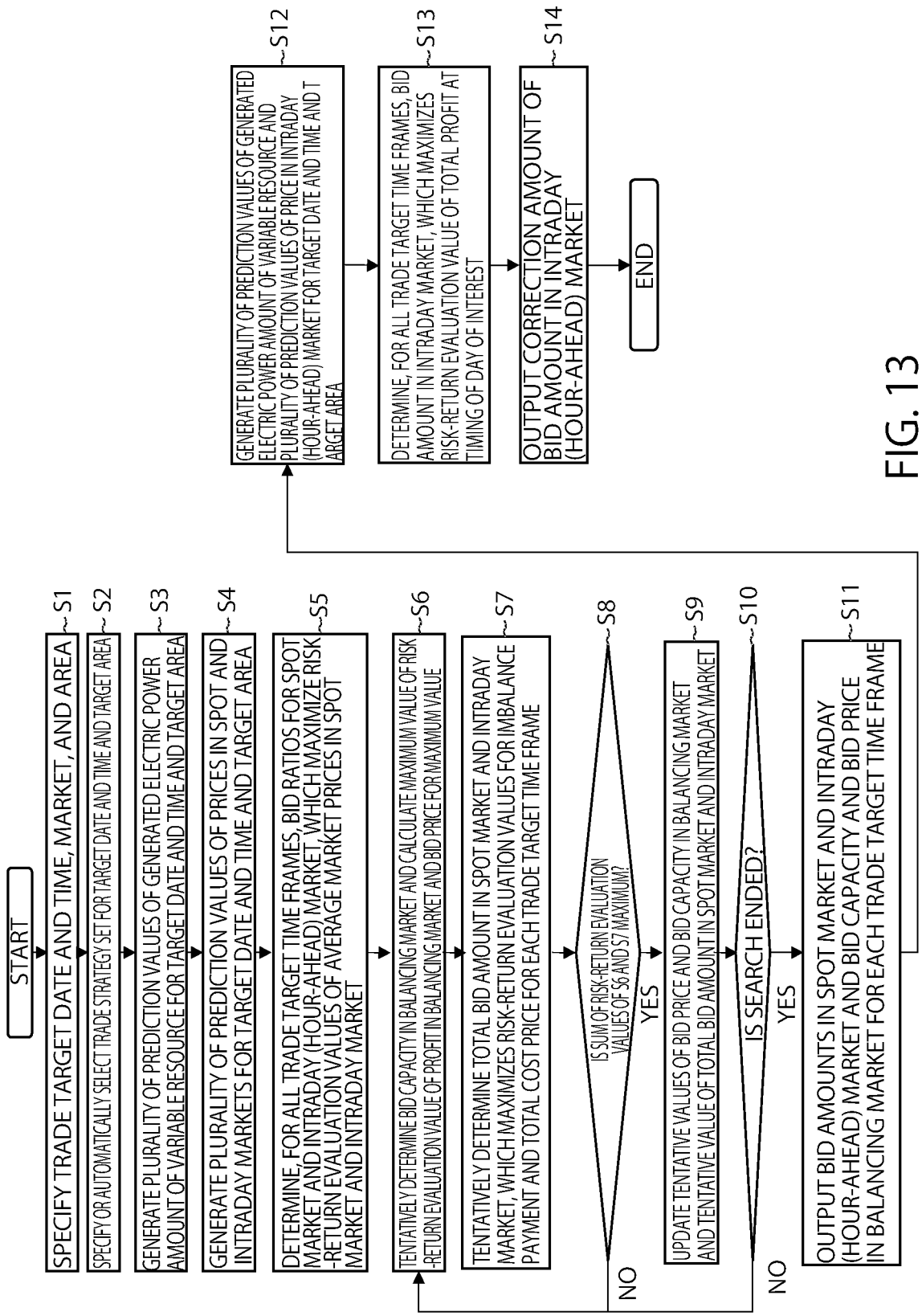
FIG. 13 is a flowchart of an example of operation of the information processing device according to the present embodiment.

FIG. 13 is a flowchart of an example of operation of the information processing device according to the present embodiment.

First, a trade target day is specified. Not all time frames of the target day are trade targets in some cases, and in such a case, a target time slot is specified as well (S1). The trade target day may be determined based on information input through the inputter 105 by the user or may be determined by another predetermined method. In addition, a trade target area (target area) may be selected when possible.

Subsequently, the strategy determiner 114 selects, among a plurality of trade strategies, a set of a trade strategy to be used in the balancing market and a trade strategy to be applied to determination of each of a bid amount ratio and a bid amount sum in a selected time frame (time slot) (S2). The strategy determiner 114 may determine the trend of the market price based on past trade result data and may determine the trade strategies based on the determined trend. Alternatively, the user may select the trade strategies by using the inputter 105.

Subsequently, the predictor 106 predicts a plurality of generated energy volume of the variable resource for a target date and time (trade target time slot) and the target area (S3). The plurality of prediction values of the generated energy volume correspond to, for example, the PV-generated energy volume prediction value and the wind-generated energy volume prediction value in the plurality of predictions 1 to R in FIG. 7. In addition, the predictor 106 predicts a plurality of prices in the spot market and a plurality of prices in the intraday market for the target date and time (trade target time slot) and the target area (S4). The predicted prices in the markets correspond to the spot market price prediction value and the intraday market price prediction value in the plurality of predictions 1 to R in FIG. 7. The spot market corresponds to the first market, and the intraday market corresponds to the second market.

The bidding content determiner 113 determines the bid amount ratios for the spot market and the intraday market based on the plurality of price prediction values in the spot market and the plurality of price prediction values in the intraday market (S5). In step S5, all trade target time frames are calculated.

Subsequently, the bid amount in the balancing market is tentatively determined based on the prediction values of the operation volume and the average price in the balancing market for a plurality of days, and the maximum value of the risk-return evaluation value of the profit in the balancing market, and the bid price for the maximum value are calculated (S6). The balancing market corresponds to the third market.

Subsequently, the total bid amount in the spot market and the hour-ahead market, which maximizes risk-return evaluation values for the imbalance payment and the total cost price is tentatively determined for each trade target time frame (S7).

When the sum of the risk-return evaluation values calculated at steps S6 and S7 is maximum (YES at S8), tentative values of the bid price and the bid capacity in the balancing market and a tentative value of the total bid amount in the spot market and the hour-ahead market for each time frame are updated (S9). When the sum of the evaluation values is not maximum (NO at S8), the operation returns to step S6.

When it is determined that search is ended (YES at S10), the operation proceeds to step S11. Otherwise (NO at S10), the operation returns to step S6.

Subsequently, the bid amount in the spot market and the bid amount in the intraday (hour-ahead) market for each trade target time frame are calculated from the bid amount ratios and the total bid amount thus determined in advance for each time frame, and the bid amount and the bid price in the balancing market are output together (S11). The operation up to step S11 is processing performed before the gate close time of the spot market or the balancing market on the previous day of the trade target day.

Steps S6, S8, and S9 are unnecessary when bidding is not performed in the balancing market or when the contents of bidding in the balancing market are already determined.

Steps S12 to S14 are processing performed on the trade target day.

A plurality of generated energy volume of the variable resource and a plurality of prices in the intraday market for the target date and time and the target area are predicted again (S12). Step S12 is performed before the gate close time of the intraday market. For example, the prediction may be performed by a method same as that of steps S3 and S4 or may be performed by a method different from that of steps S3 and S4 by using information (for example, actual values of the generated energy volume and actual values of the price in the spot market in other time slots on the day of interest, and information of continuous trading in the intraday market) that can be acquired only on the day of interest.

The bid amount in the intraday market is determined (S13). Processing same as part of the calculation performed at step S7 is performed again by using the latest prediction values of the generated energy volume and the latest prediction values of the intraday market price, which are acquired at step S12 while variables (the bid amount in the spot market and the bid price and the bid amount in the balancing market) already confirmed on the previous day are fixed. Specifically, the bid amount after intraday correction, which maximizes a risk-return value is calculated again based on Expressions (7) and (8) described above. A correction value (correction amount) of the bid amount in the intraday market (hour-ahead market) is output (S14).

As described above, steps S5 to S12 need to be performed before the gate close time (bidding deadline time) of the balancing market, the gate close time of the spot market, and steps S15 to S17 need to be performed before the gate close time of the intraday (hour-ahead) market. The decision-making timings thereof are different from one another. In the present invention, decision-making is divided into a plurality of partial problems to individually maximize the risk-return evaluation values.

A procedure may be added in which a content determined at each step is sequentially checked and approved by the user of the trade support device. Specifically, after end of step S10, the determined bid price and the determined bid capacity in the balancing market and the risk-return evaluation value thereof are presented to the user and approved or changed by the user in some cases. The user may perform a changing or approving step through the inputter 105. Alternatively, other candidate values of the bid price and the bid capacity may be presented so that a candidate value is selected by the user through the inputter 105.

After end of step S10, the bid amount in the spot market in each time frame and the risk-return evaluation value thereof are presented to the user and approved or changed by the user in some cases. The user may perform a changing or approving step through the inputter 105. Alternatively, other candidate values of the bid amount may be presented so that a candidate value is selected by the user through the inputter 105.

After end of step S5, the bid amount ratios for the spot market and the intraday market (or an average electric power selling price based on the bid amount ratios) and the risk-return evaluation value thereof are presented to the user and approved or changed by the user in some cases. The user may perform a changing or approving step through the inputter 105. Alternatively, other candidate values of the bid amount ratio may be presented so that a candidate value is selected by the user through the inputter 105.

After end of step S14, the corrected bid amount in the intraday market and the risk-return evaluation value thereof are presented to the user and approved or changed by the user in some cases. The user may perform a changing or approving step through the inputter 105. Alternatively, other candidate values of the total bid amount or other candidate values of the bid amount in each electric power market may be presented so that candidate values are selected by the user through the inputter 105.

As described above, according to the present embodiment, it is possible to appropriately determine the bid amounts in a plurality of markets from a risk-return viewpoint with simultaneously taken into consideration influence of uncertainty in both of the generated amount of renewable-energy electric power (the generated energy volume of a variable resource) and a plurality of market prices. Accordingly, it is possible to appropriately design a portfolio of the bid amounts in a plurality of markets in aggregation business that sells, in a plurality of kinds of electric power markets, generated electric power bought from the variable resource as well as electric power bought from a regulatable resource.

(Hardware Configuration)

Figure 14:
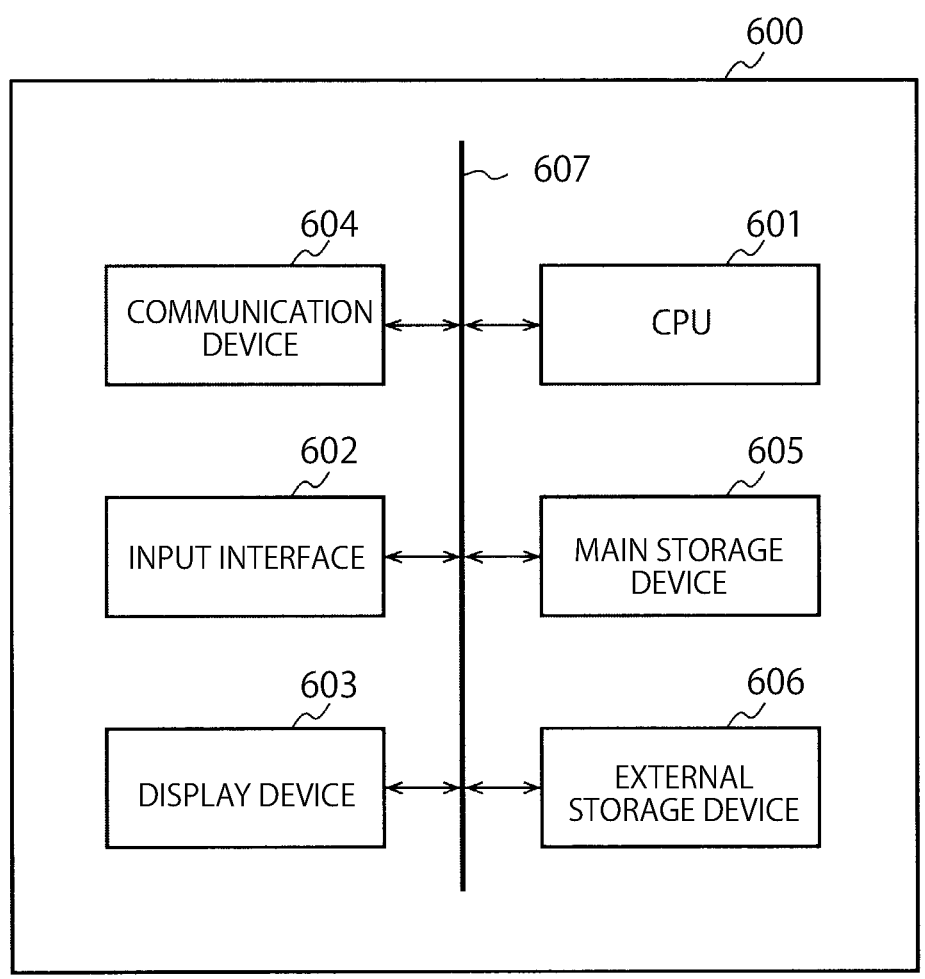
FIG. 14 is a diagram illustrating a hardware configuration of the information processing device according to the present embodiment.

FIG. 14 illustrates a hardware configuration of the device in FIG. 4. The device in FIG. 4 is configured as a computer device 600. The computer device 600 includes a CPU 601, an input interface 602, a display device 603, a communication device 604, a main storage device 605, and an external storage device 606, and these components are mutually connected through a bus 607.

The CPU (central processing unit) 601 executes an information processing program as a computer program on the main storage device 605. The information processing program is a computer program configured to achieve each above-described functional component of the present device. The information processing program may be achieved by a combination of a plurality of computer programs and scripts instead of one computer program. Each functional component is achieved as the CPU 601 executes the information processing program.

The input interface 602 is a circuit for inputting, to the present device, an operation signal from an input device such as a keyboard, a mouse, or a touch panel. The input interface 602 corresponds to the inputter 105.

The display device 603 displays data output from the present device. The display device 603 is, for example, a liquid crystal display (LCD), an organic electroluminescence display, a cathode-ray tube (CRT), or a plasma display (PDP) but is not limited thereto. Data output from the computer device 600 can be displayed on the display device 603.

The communication device 604 is a circuit for the present device to communicate with an external device in a wireless or wired manner. Data can be input from the external device through the communication device 604. The data input from the external device can be stored in the main storage device 605 or the external storage device 606.

The main storage device 605 stores, for example, the information processing program, data necessary for execution of the information processing program, and data generated through execution of the information processing program. The information processing program is loaded and executed on the main storage device 605. The main storage device 605 is, for example, a RAM, a DRAM, or an SRAM but is not limited thereto. Each storage or database in FIG. 4 may be implemented on the main storage device 605.

The external storage device 606 stores, for example, the information processing program, data necessary for execution of the information processing program, and data generated through execution of the information processing program. The information processing program and the data are read onto the main storage device 605 at execution of the information processing program. The external storage device 606 is, for example, a hard disk, an optical disk, a flash memory, or a magnetic tape but is not limited thereto. Each storage or database in FIG. 4 may be implemented on the external storage device 606.

The information processing program may be installed on the computer device 600 in advance or may be stored in a storage medium such as a CD-ROM. Moreover, the information processing program may be uploaded on the Internet.

The present device may be configured as a single computer device 600 or may be configured as a system including a plurality of mutually connected computer devices 600.

The present invention is not limited to the above-described embodiments but may be materialized by components modified without departing from the scope thereof when performed. Various kinds of inventions may be formed by combining a plurality of components disclosed in the above-described embodiments as appropriate. For example, some components may be deleted from among all components described in the embodiment. Moreover, components described in different embodiments may be combined as appropriate.

The invention claimed is:

1. An information processing device comprising:
processing circuitry configured to:
acquire power generation results of a first electric power generation resource, wherein an amount of power generated by the first electric power generation resource varies depending on weather conditions, and wherein the power generated by the first electric power generation resource can be supplied to an electric power system;
generate a plurality of pieces of first prediction data on an amount of electric power generated by the first electric power generation resource based on the power generation results;
acquire, from an external server, penalty information of a penalty imposed when an amount of electric power supplied to the electric power system is insufficient or excessive for a planned value of electric power generation amount;
calculate, based on the first prediction data and the penalty information, a first index being an index related to a yield assuming that a first amount of electric power is tentatively bid for a day-ahead market and a third amount of electric power is tentatively bid for an intraday market; and
determine a second amount of electric power to be bid for the day-ahead market and a fourth amount of electric power to be bid for the intraday market based on the first index,
wherein
the planned value of electric power generation amount is a sum of amounts of electric power traded for the day-ahead market and the intraday market, and
the processing circuitry is further configured to:
fix an amount of electric power to be bid for the day-ahead market to the second amount of electric power, and calculate a second index being an index related to the yield assuming that the third amount of electric power is tentatively bid for the intraday market based on a plurality of pieces of fourth prediction data on the amount of electric power, generated by the first electric power generation resource, obtained after bidding for the day-ahead market is closed and before bidding for the intraday market is closed; and re-determine, based on the second index, the fourth amount of electric power to be bid for the intraday market.

2. The information processing device according to claim 1, wherein the processing circuitry
calculates the first index based on a plurality of pieces of second prediction data of a trade price of electric power for the day-ahead market and a plurality of pieces of third prediction data on a trade price of electric power for the intraday market,
fixes an amount of electric power to be bid for the day-ahead market to the second amount of electric power, and calculates the second index based on a plurality of pieces of fifth prediction data of an electric power price for the intraday market acquired after bidding for the day-ahead market is closed and before bidding for the intraday market is closed, and
re-determines, based on the second index, the fourth amount of electric power to be bid for the intraday market.

3. The information processing device according to claim 1, wherein the processing circuitry determines, based on the first index, a bid amount ratio which is a ratio of the second amount of electric power and the fourth amount of electric power to be bid for the day-ahead market and the intraday market, respectively.

4. The information processing device according to claim 1, wherein
the processing circuitry calculates a third index being an index related to the yield based on the bid amount ratio, and
the processing circuitry determines, based on the third index, a total amount of the second amount of electric power and the fourth amount of electric power to be bid for the day-ahead market and the intraday market, respectively.

5. The information processing device according to claim 1, wherein
a balancing marked is a market in which supply of entire or part of an energy volume for which the bid is succeeded is made depending on whether an operation request is made from an electric power system operator,
the processing circuitry calculates a fourth index being index related to a yield in a case that a fifth amount of electric power is bid for the balancing market, and
the processing circuitry determines, based on the fourth index, a sixth amount of electric power to be bid for the balancing market.

6. The information processing device according to claim 5, wherein the determiner determines, based on the fourth index, a bid price to be bid for the balancing market.

7. The information processing device according to claim 5, wherein the processing circuitry simultaneously determines the sixth amount of electric power to be bid for the balancing market and the second amount of electric power to be bid for the day-ahead market.

8. The information processing device according to claim 7, wherein the processing circuitry presents, on an interface for a user, as a candidate for an amount of electric power to be bid for the balancing market, the candidate including the fourth index and information indicating the sixth amount of electric power, and redetermines, based on information input through the interface, the amount of electric power to be bid for the balancing market.

9. The information processing device according to claim 1, wherein the processing circuitry presents, on an interface for a user, a candidate for an amount of electric power to be bid for the day-ahead market, the candidate including the first index and information indicating the second amount of electric power and the fourth amount of electric power, and redetermines, based on information input through the interface, an amount of electric power to be bid for the day-ahead market.

10. The information processing device according to claim 1, wherein
the first electric power generation resource is an electric power generation resource configured to generate renewable energy,
the amount of electric power supplied to the electric power system is acquired based on the first electric power generation resource and a second electric power generation resource capable of regulating an amount of generated electric power, and
the yield is calculated based on a total trade price of the second amount of electric power for the day-ahead market, a cost price of an amount of electric power procured from the first electric power generation resource, a cost price of an amount of electric power procured from the second electric power generation resource, and the penalty.

11. The information processing device according to claim 1, wherein the processing circuitry determines at least one of the first to fourth indexes to be used among a plurality of indexes based on transition of a trade price in result data of past trading for the day-ahead market or a market different from the day-ahead market.

12. The information processing device according to claim 1, wherein the amount of electric power generated by the first electric power generation resource and a trade price by which the second amount of electric power is traded for the day-ahead market have uncertainty.

13. The information processing device according to claim 1, wherein the information processing device is an aggregator, and the aggregator sends bid data indicating the determined second amount of electric power to the day-ahead market and send bid data indicating the re-determined fourth amount of electric power to the intraday market.

14. An information processing method comprising:
acquiring power generation results of a first electric power generation resource, wherein an amount of power generated by the first electric power generation resource varies depending on weather conditions, and wherein the power generated by the first electric power generation resource can be supplied to an electric power system;
generating a plurality of pieces of first prediction data on an amount of electric power generated by the first electric power generation resource based on the power generation results;
acquiring, from an external server, penalty information of a penalty imposed when an amount of electric power supplied to the electric power system is insufficient or excessive for a planned value of electric power generation amount,
calculating, based on the first prediction data and the penalty information, a first index being an index related to a yield assuming that a first amount of electric power is tentatively bid for a day-ahead market and a third amount of electric power is tentatively bid for an intraday market; and
determining a second amount of electric power to be bid for the day-ahead market and a fourth amount of electric power to be bid for the intraday market based on the first index, wherein
the planned value of electric power generation amount is a sum of amounts of electric power traded for the day-ahead market and the intraday market, and
the method further comprises:
fixing an amount of electric power to be bid for the day-ahead market to the second amount of electric power, and calculating a second index being an index related to the yield assuming that the third amount of electric power is tentatively bid for the intraday market based on a plurality of pieces of fourth prediction data on the amount of electric power, generated by the first electric power generation resource, obtained after bidding for the day-ahead market is closed and before bidding for the intraday market is closed, and
re-determining, based on the second index, the fourth amount of electric power to be bid for the intraday market.

15. A non-transitory computer readable medium having a computer program stored therein which when executed by a computer, causes the computer to perform processes comprising:
acquiring power generation results of a first electric power generation resource, wherein an amount of power generated by the first electric power generation resource varies depending on weather conditions, and wherein the power generated by the first electric power generation resource can be supplied to an electric power system;
generating a plurality of pieces of first prediction data on an amount of electric power generated by the first electric power generation resource based on the power generation results;
acquiring, from an external server, penalty information of a penalty imposed when an amount of electric power supplied to the electric power system is insufficient or excessive for a planned value of electric power generation amount,
calculating, based on the first prediction data and the penalty information, a first index being an index related to a yield assuming that a first amount of electric power is tentatively bid for a day-ahead market and a third amount of electric power is tentatively bid for an intraday market; and
determining a second amount of electric power to be bid for the day-ahead market and a fourth amount of electric power to be bid for the intraday market based on the first index,
wherein
the planned value of electric power generation amount is a sum of amounts of electric power traded for the day-ahead market and the intraday market, and
the computer program further causes the computer to perform processes comprising:
fixing an amount of electric power to be bid for the day-ahead market to the second amount of electric power, and calculating a second index being an index related to the yield assuming that the third amount of electric power is tentatively bid for the intraday market based on a plurality of pieces of fourth prediction data on the amount of electric power, generated by the first electric power generation resource, obtained after bidding for the day-ahead market is closed and before bidding for the intraday market is closed; and
re-determining, based on the second index, the fourth amount of electric power to be bid for the intraday market.

* * * * *